(12) United States Patent
Cheng et al.

(10) Patent No.: US 12,336,043 B2
(45) Date of Patent: Jun. 17, 2025

(54) SIDELINK DRX CONFIGURATION FOR UNICAST

(71) Applicant: QUALCOMM Incorporated, San Diego, CA (US)

(72) Inventors: Hong Cheng, Basking Ridge, NJ (US); Junyi Li, Fairless Hills, PA (US); Qing Li, Princeton Junction, NJ (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 17/653,852

(22) Filed: Mar. 7, 2022

(65) Prior Publication Data

US 2022/0304103 A1    Sep. 22, 2022

Related U.S. Application Data

(60) Provisional application No. 63/162,978, filed on Mar. 18, 2021.

(51) Int. Cl.
  *H04W 76/28* (2018.01)
  *H04W 76/14* (2018.01)
  *H04W 92/18* (2009.01)

(52) U.S. Cl.
  CPC ........... *H04W 76/28* (2018.02); *H04W 76/14* (2018.02); *H04W 92/18* (2013.01)

(58) Field of Classification Search
  CPC ...... H04W 76/28; H04W 76/14; H04W 92/18
  See application file for complete search history.

(56) References Cited

U.S. PATENT DOCUMENTS

| | | | | |
|---|---|---|---|---|
| 2020/0344722 | A1* | 10/2020 | He | H04W 4/46 |
| 2021/0227464 | A1* | 7/2021 | Kung | H04W 52/0216 |
| 2021/0227465 | A1* | 7/2021 | Kung | H04W 72/23 |
| 2021/0227620 | A1* | 7/2021 | Pan | H04W 4/40 |
| 2021/0227622 | A1* | 7/2021 | Kung | H04W 76/28 |
| 2022/0150730 | A1* | 5/2022 | Freda | H04W 76/19 |

(Continued)

FOREIGN PATENT DOCUMENTS

| | | |
|---|---|---|
| WO | 2021031938 A1 | 2/2021 |
| WO | 2022060201 A1 | 3/2022 |
| WO | 2022082639 A1 | 4/2022 |

OTHER PUBLICATIONS

Ericsson: "DRX for Sidelink Communications", 3GPP TSG-RAN WG2 Meeting #112-e, R2-2009231, 3rd Generation Partnership Project, Mobile Competence Centre, 650, Route Des Lucioles, F-06921 Sophia-Antipolis Cedex, France, vol. RAN WG2, No. e-Meeting, Nov. 2, 2020-Nov. 13, 2020, Oct. 22, 2020, XP051941278, pp. 1-6.

(Continued)

*Primary Examiner* — Fahmida S Chowdhury
(74) *Attorney, Agent, or Firm* — Procopio, Cory, Hargreaves & Savitch

(57) ABSTRACT

A first user equipment (UE) transmits, to a second UE, a transmission configuration indicating first timing information for a discontinuous reception (DRX) configuration for sidelink transmission from the first UE. The first UE transmits, to the second UE, a reception configuration indicating second timing information for the DRX configuration for sidelink reception by the first UE. The first UE receives a response from the second UE confirming or rejecting the DRX configuration.

32 Claims, 13 Drawing Sheets

(56) References Cited

U.S. PATENT DOCUMENTS

| | | | |
|---|---|---|---|
| 2022/0174780 A1 | 6/2022 | Bao et al. | |
| 2022/0322486 A1* | 10/2022 | Park | H04W 76/14 |
| 2022/0353815 A1* | 11/2022 | Lin | H04W 52/0232 |
| 2022/0369417 A1* | 11/2022 | Park | H04W 52/0258 |
| 2023/0014303 A1* | 1/2023 | Di Girolamo | H04W 72/20 |
| 2023/0064488 A1* | 3/2023 | Han | H04W 76/28 |
| 2023/0164696 A1* | 5/2023 | Yang | H04W 52/0216 |
| | | | 370/311 |
| 2023/0217536 A1* | 7/2023 | Sun | H04W 76/14 |
| | | | 370/328 |
| 2023/0224986 A1* | 7/2023 | Wu | H04W 40/12 |
| | | | 370/310 |
| 2023/0337140 A1* | 10/2023 | Miao | H04L 5/0053 |
| 2024/0064855 A1* | 2/2024 | Wu | H04W 72/25 |

OTHER PUBLICATIONS

International Search Report and Written Opinion—PCT/US2022/019387—ISA/EPO—Jun. 21, 2022.

LG Electronics Inc: "Discussion on SL DRX Wake-Up Time Alignment Between", 3GPP TSG-RAN WG2 Meeting #113 electronic, R2-21017061, 3rd Generation Partnership Project, Mobile Competence Centre, 650, Route Des Lucioles, F-06921 Sophia-Antipolis Cedex, France, vol. RAN WG2, No. electronic, Jan. 25, 2021-Feb. 5, 2021, Jan. 15, 2021, XP051974573, pp. 1-3.

OPPO: "Discussion on Configuration and Parameter for Sidelink DRX", 3GPP TSG-RAN WG2 #113-e, R2-2100273, 3rd Generation Partnership Project, Mobile Competence Centre, 650, Route Des Lucioles, F-06921 Sophia-Antipolis Cedex, France, vol. RAN WG2, No. E-meeting, Jan. 1, 2021, Jan. 15, 2021, XP051973473, pp. 1-8.

\* cited by examiner

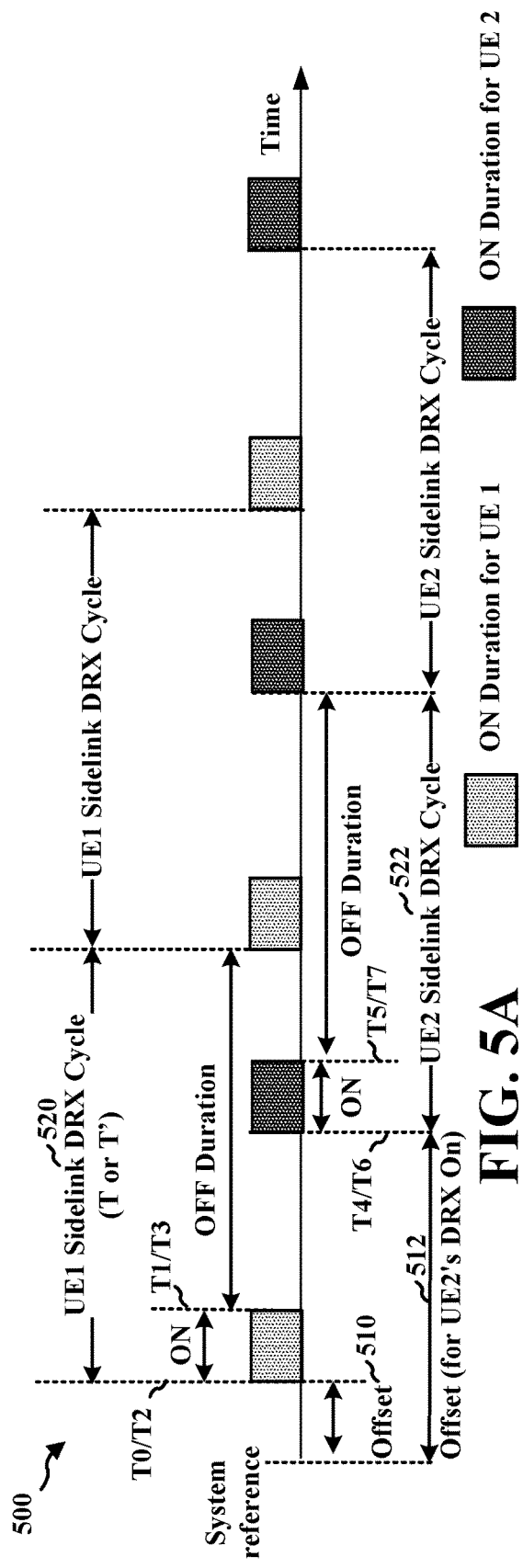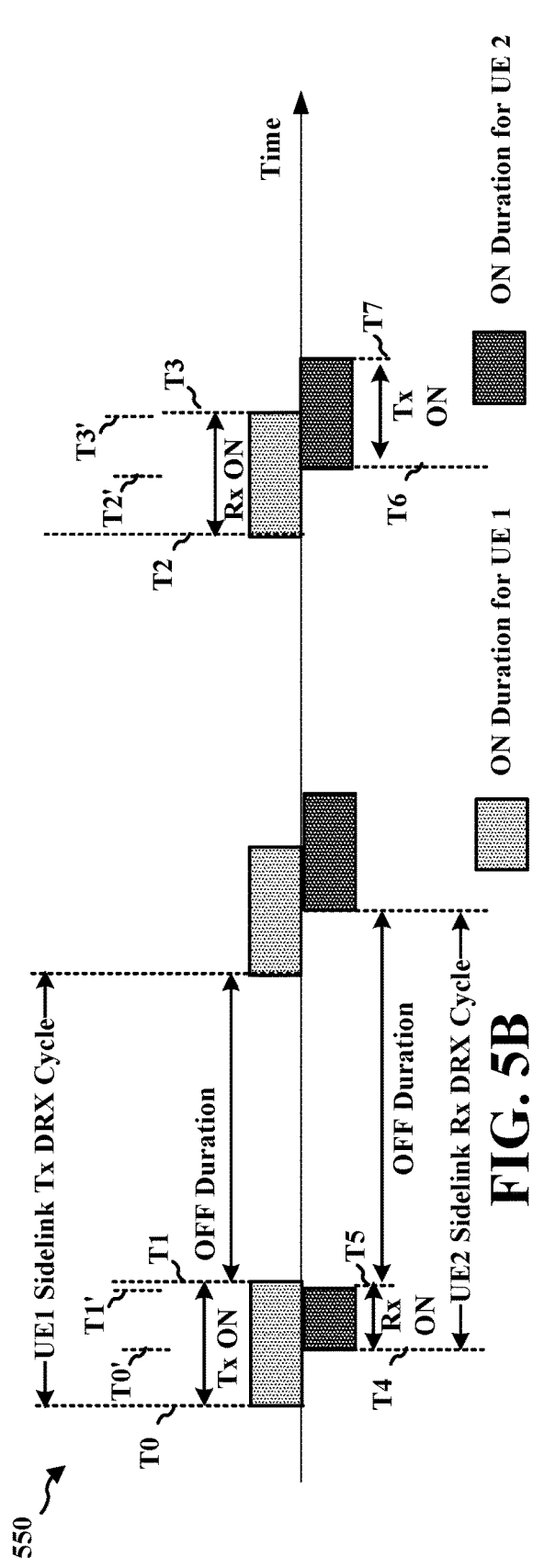
FIG. 5A
FIG. 5B

SIDELINK DRX CONFIGURATION FOR UNICAST

CROSS-REFERENCE TO RELATED APPLICATION(S)

This application claims the benefit of U.S. Provisional Application Ser. No. 63/162,978, entitled "Sidelink DRX Configuration for Unicast" and filed on Mar. 18, 2021, which is expressly incorporated by reference herein in its entirety.

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). For example, the apparatus transmits, to a second UE, a transmission configuration indicating first timing information for a discontinuous reception (DRX) configuration for sidelink transmission from the first UE. The apparatus transmits, to the second UE, a reception configuration indicating second timing information for the DRX configuration for sidelink reception by the first UE. The apparatus receives a response from the second UE confirming or rejecting the DRX configuration.

In another aspect of the disclosure, a method, a computer-readable medium, and an apparatus are provided for wireless communication including receiving DRX information from a first UE at a second UE. For example, the apparatus receives, from the first UE, a transmission configuration indicating first timing information for a DRX configuration for sidelink transmission from the first UE and receives, from the first UE, a reception configuration indicating second timing information for the DRX configuration for sidelink reception by the first UE. The apparatus transmits a response to the first UE confirming or rejecting the DRX configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 5A and 5B illustrate example timelines for sidelink DRX operation.

DETAILED DESCRIPTION

Figure 1:
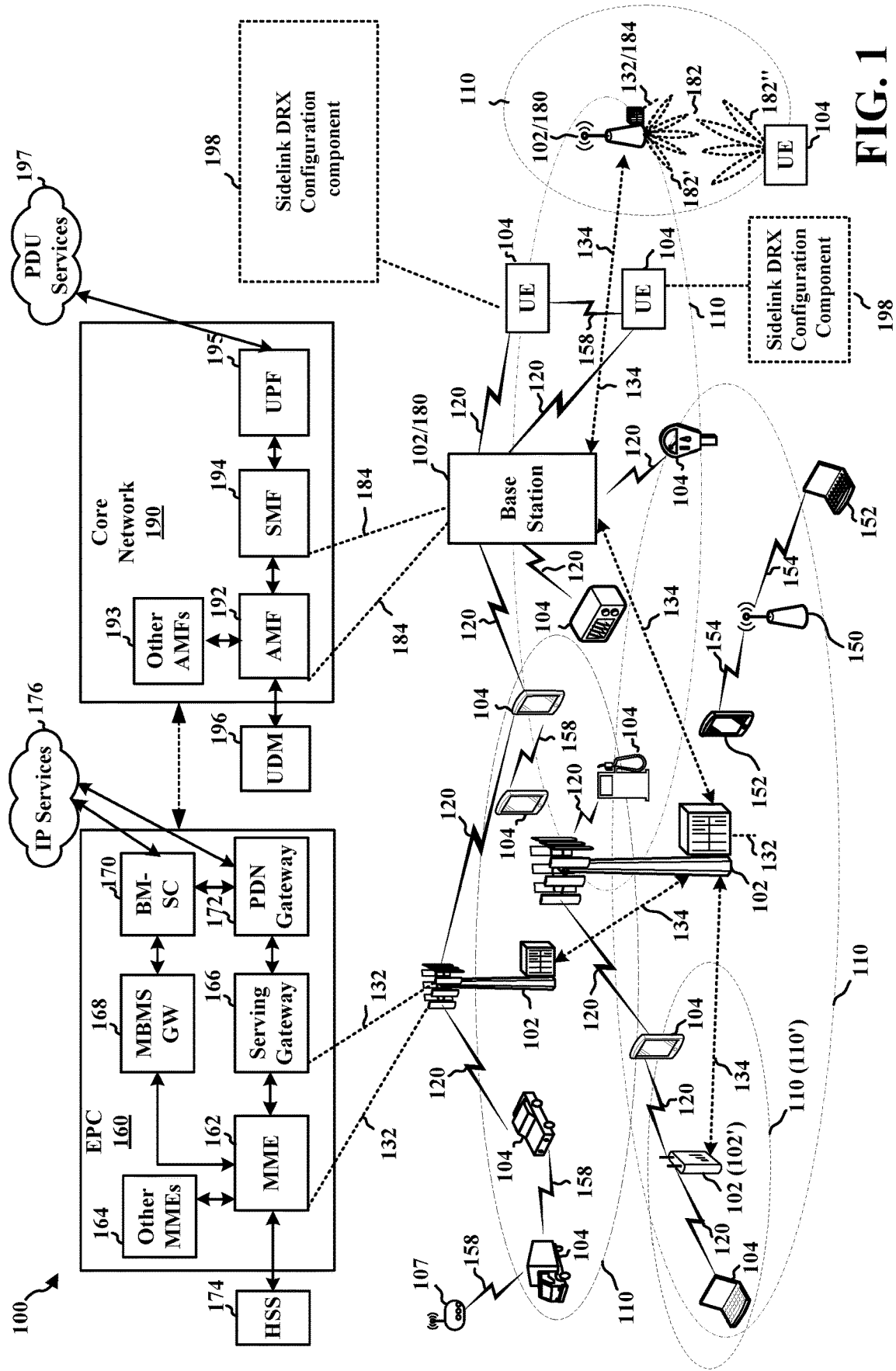
FIG. 1 is a diagram illustrating an example of a wireless communications system and an access network.

Some UEs may perform sidelink communication. Sidelink communication may include a direct transmission from one UE that is received via a second UE, e.g., without being received and provided to the second UE via a base station. UE may support discontinuous reception (DRX). In a DRX mode, the UE may discontinuously monitor/receive for sidelink communication and/or may discontinuously transmit sidelink communication using an ON/OFF cycle. In some aspects, the ON/OFF cycle may be referred to as a sleep and wake cycle. DRX may conserve batter power at the UE. Aspects presented herein enable UEs to exchange information about directional sidelink DRX configurations for unicast in order to negotiate a DRX configuration based on timing and QoS for each of the UEs.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. In FIG. 1, in certain aspects, a first UE 104, or other device communicating based on sidelink, may include a sidelink DRX configuration component 198 configured to transmit, to a second UE, a transmission configuration indicating first timing information for a DRX configuration for sidelink transmission from the first UE 104 and to transmit a reception configuration indicating second timing information for the DRX configuration for sidelink reception by the first UE 104. The second UE may be under coverage of the same base station as the first UE or may be under coverage of a different bases station than the first UE, or may be out of coverage of the network. The sidelink DRX configuration component 198 may be further configured to receive a response from the second UE confirming or rejecting the DRX configuration. The first UE 104 may establish the RRC connection, continue the RRC connection, or release the RRC connection based on the response from the second UE, e.g., as described in more detail in connection with FIGS. 7-10.

In some aspects, the sidelink DRX configuration component 198 may be further configured to receive, from another UE, a transmission configuration indicating first timing information for a DRX configuration for sidelink transmission from the other UE and a reception configuration indicating second timing information for the DRX configuration for sidelink reception by the other UE. The sidelink DRX configuration component 198 may be further configured to transmit a response to the other UE confirming or rejecting the DRX configuration. The UE 104 may establish the RRC connection, continue the RRC connection, or release the RRC connection based on the response from the second UE, e.g., as described in more detail in connection with FIGS. 7-10.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate in the form of vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), and/or a combination thereof and/or with other devices, which can be collectively referred to as vehicle-to-anything (V2X) communications. Sidelink communication may be based on V2X or other D2D communication, such as Proximity-based Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and/or another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In another deployment example, the base station may also be configured to support 4G LTE or other access technology at the same time. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). In another example, the base stations may also support Non-Public Network (NPN), in the form of either stand-alone Non-Public Network (SNPN) or Public Network Integrated NPN (PNI-NPN). Access to the base stations may be controlled with Closed Access Group (CAG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 104 provides QoS flow and session management. All user plane PDU session packets, e.g. IP, Ethernet, or unstructured packets, are transferred through the UPF 195. The UPF 195 may provide UE IP address allocation as well as other functions. The UPF 195 is connected to the PDU Services 197. The PDU Services 197 may include the Internet, an intranet, an IP Multimedia Subsystem (IMS), a Packet Switch (PS) Streaming (PSS) Service, and/or other IP or non-IP based services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. Connections between these devices may be Wi-Fi, Bluetooth, Sidelink, or other D2D communication technologies.

Figure 2:
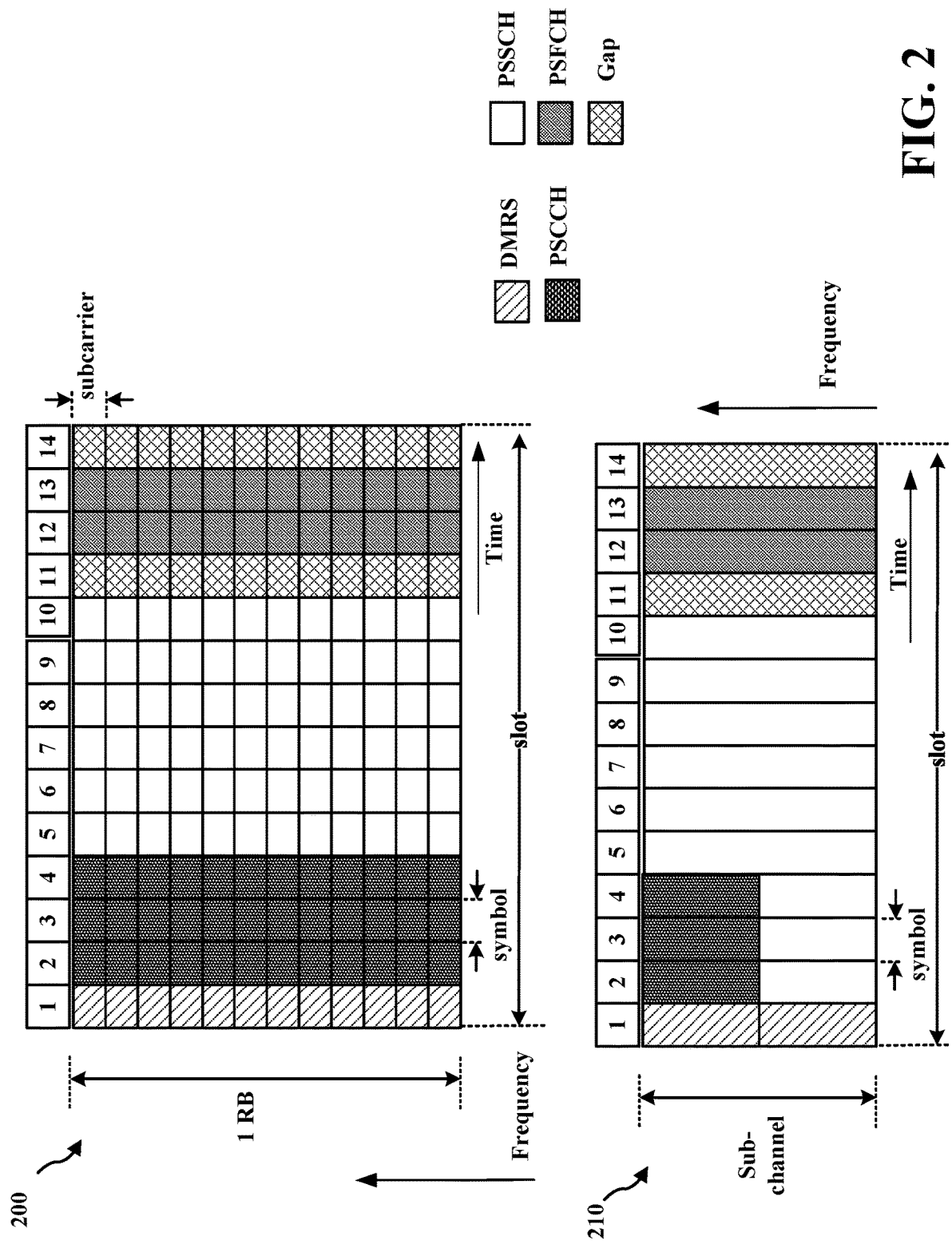
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
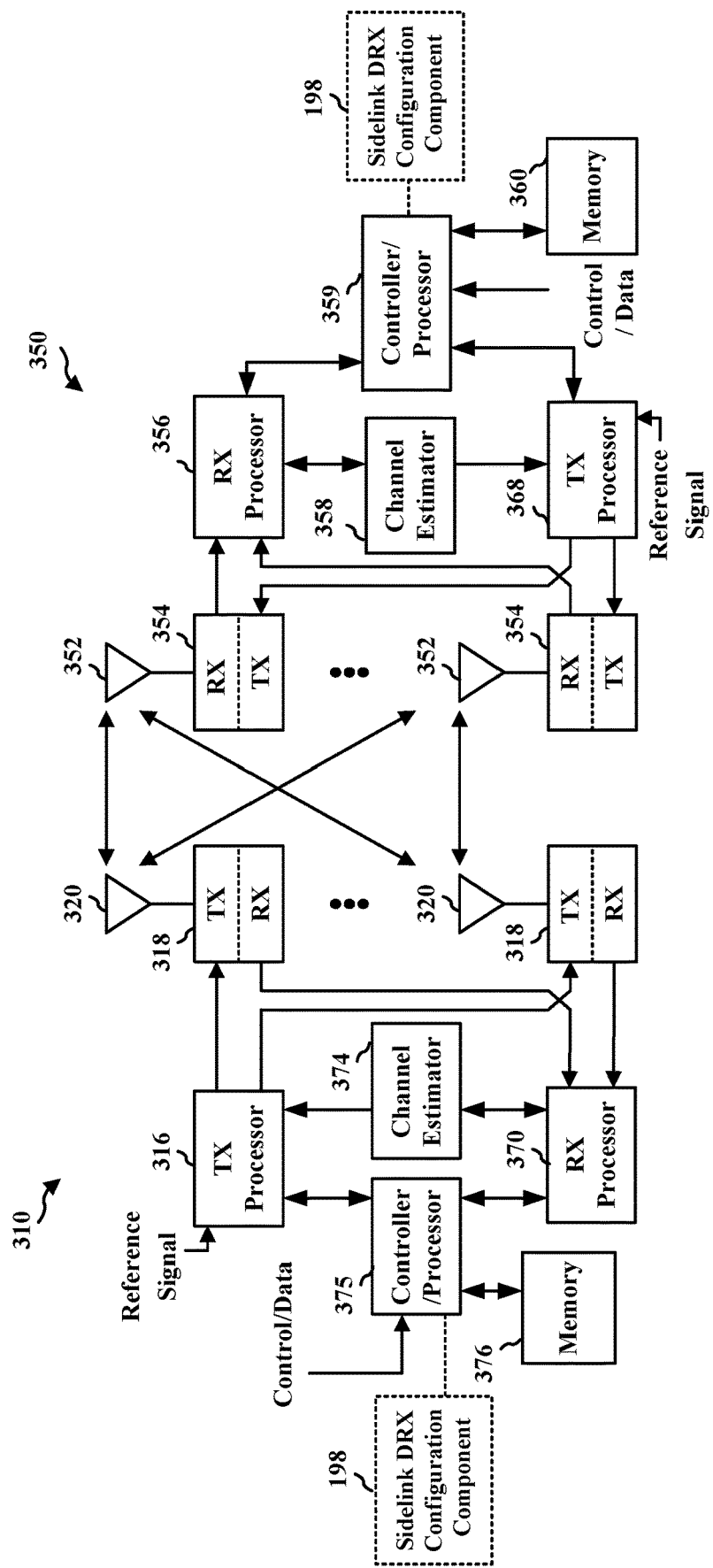
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D/ProSe communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Various layer functionality may include a radio resource control (RRC) layer, and a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate an RF carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The transmission is processed at the device 310 in a manner similar to that described in connection with the receiver function at the device 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink DRX configuration component 198 of FIG. 1.

Similarly, at least one of the TX processor 316, the RX processor 370, and the controller/processor 375 may be configured to perform aspects in connection with the sidelink DRX configuration component 198 of FIG. 1.

Figure 4:
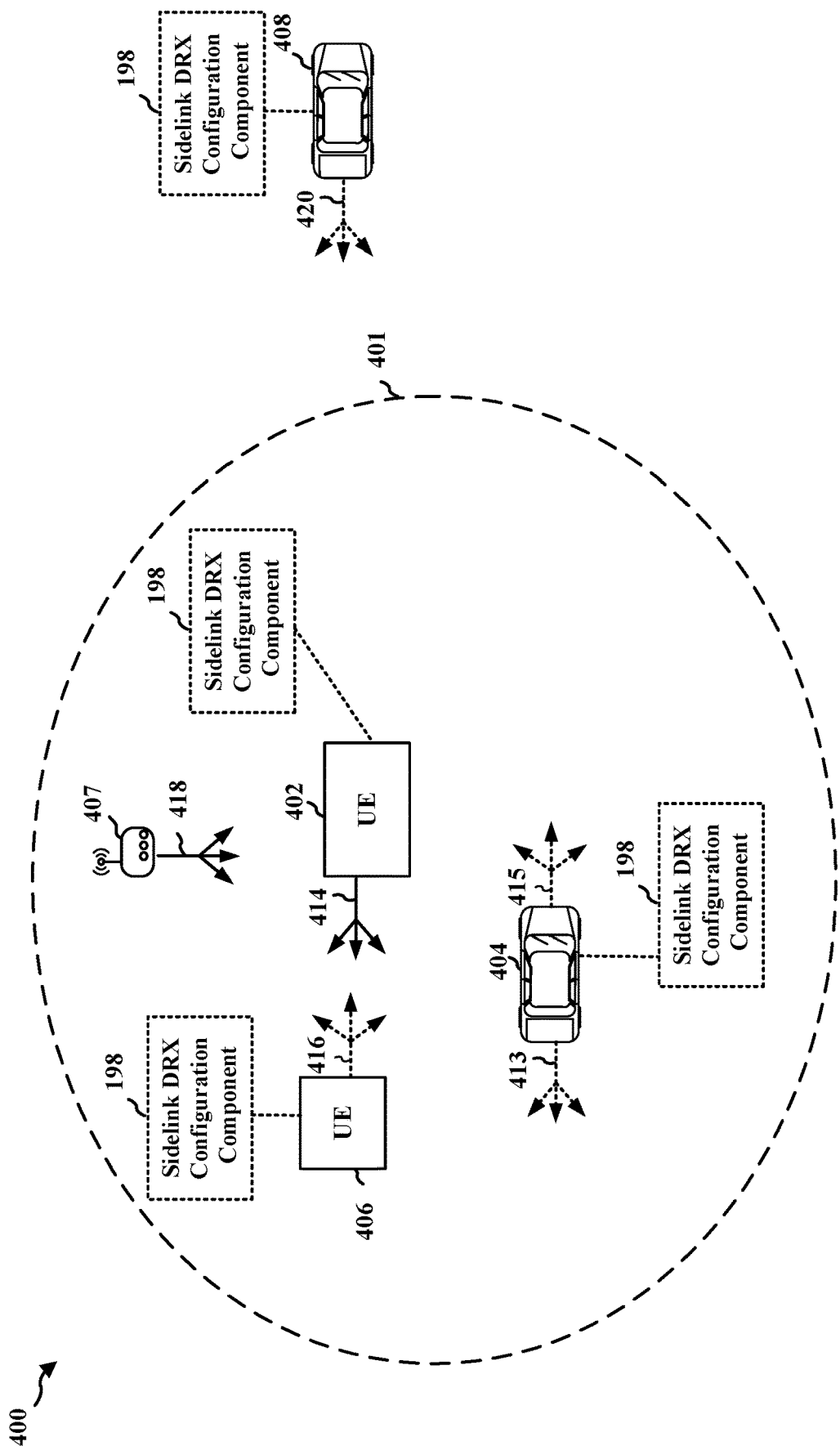
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally, or alternatively, RSU 407 may receive communication from and/or transmit communication 418 to UEs 402, 404, 406, 408. One or more of the UEs 402, 404, 406, 408 or the RSU 407 may comprise a sidelink DRX configuration component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station managing the resources for the device. A first UE may reserve the selected resources in order to inform other UEs about the resources that the first UE intends to use for sidelink transmission(s). As part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may continuously monitor for (e.g., sense) and decode SCI from peer UEs and may exclude resources that are used and/or reserved by other UEs from a set of candidate resources for sidelink transmission by the UE. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

A UE may support discontinuous reception (DRX) for sidelink communication. In a DRX mode, the UE may discontinuously monitor and/or decode for sidelink communication and/or may discontinuously transmit sidelink communication using an ON/OFF cycle. In some aspects, the ON/OFF cycle may be referred to as a sleep and wake cycle. DRX may conserve batter power at the UE. In a non-DRX mode, the UE may continuously monitor and/or decode for sidelink transmissions from other UEs. The continuous monitoring may drain the UE's batter power. In the DRX mode, the UE may conserve power by periodically refraining from monitoring and/or transmitting during OFF durations according to the DRX cycle. FIGS. 5A and 5B illustrate examples of a DRX cycle for UE 1 including periodic ON durations during which the UE may transmit/receive sidelink communication and OFF durations during which the UE does not transmit/receive sidelink communication. During the OFF duration, the UE may enter a sleep mode or a lower power mode in which the UE minimizes power consumption by shutting down a radio frequency (RF) function, for example. Alternatively, during the OFF duration the UE may perform other operations, e.g. tune to a different frequency band, perform other measurements, or transmitting other signals/messages not related to the sidelink communication. During the ON duration, the UE may wake up from the OFF duration of the DRX cycle, or tune back to the related frequency bands, in order to transmit/receive sidelink communication.

As described in connection with FIG. 1 and FIG. 4, sidelink communication is exchanged between UEs. In contrast to DRX operation for an access link that may be configured for the UE by a bases station, sidelink DRX operation may affect both a transmitting UE and a receiving UE for even unicast sidelink operation. Sidelink DRX operation may be configured for a sidelink unicast link between the two UEs, e.g., after the sidelink unicast link is established between the two UEs. The sidelink DRX configuration may be configured per a pair of a source and a destination. The source may be a first UE and the destination may be the second UE, for example. For unicast sidelink communication, the DRX configuration may be configured per direction on the unicast link. For example, the DRX configuration may be separately configured for DRX transmission from the first UE on the sidelink unicast link, DRX reception by the first UE on the sidelink unicast link, DRX transmission from the second UE on the sidelink unicast link, and DRX reception by the second UE on the sidelink unicast link. Aspects presented herein provide for a UE to initiate a sidelink DRX configuration that may be accepted, rejected, and/or adjusted by the other UE. Aspects presented herein may be applied for UEs in an OOC setting in which one or more of the UEs are outside of coverage of a base station (e.g., base station 102 or 180 in FIG. 1) and/or in an in-coverage setting in which the UEs are within coverage of a base station.

Figure 6:
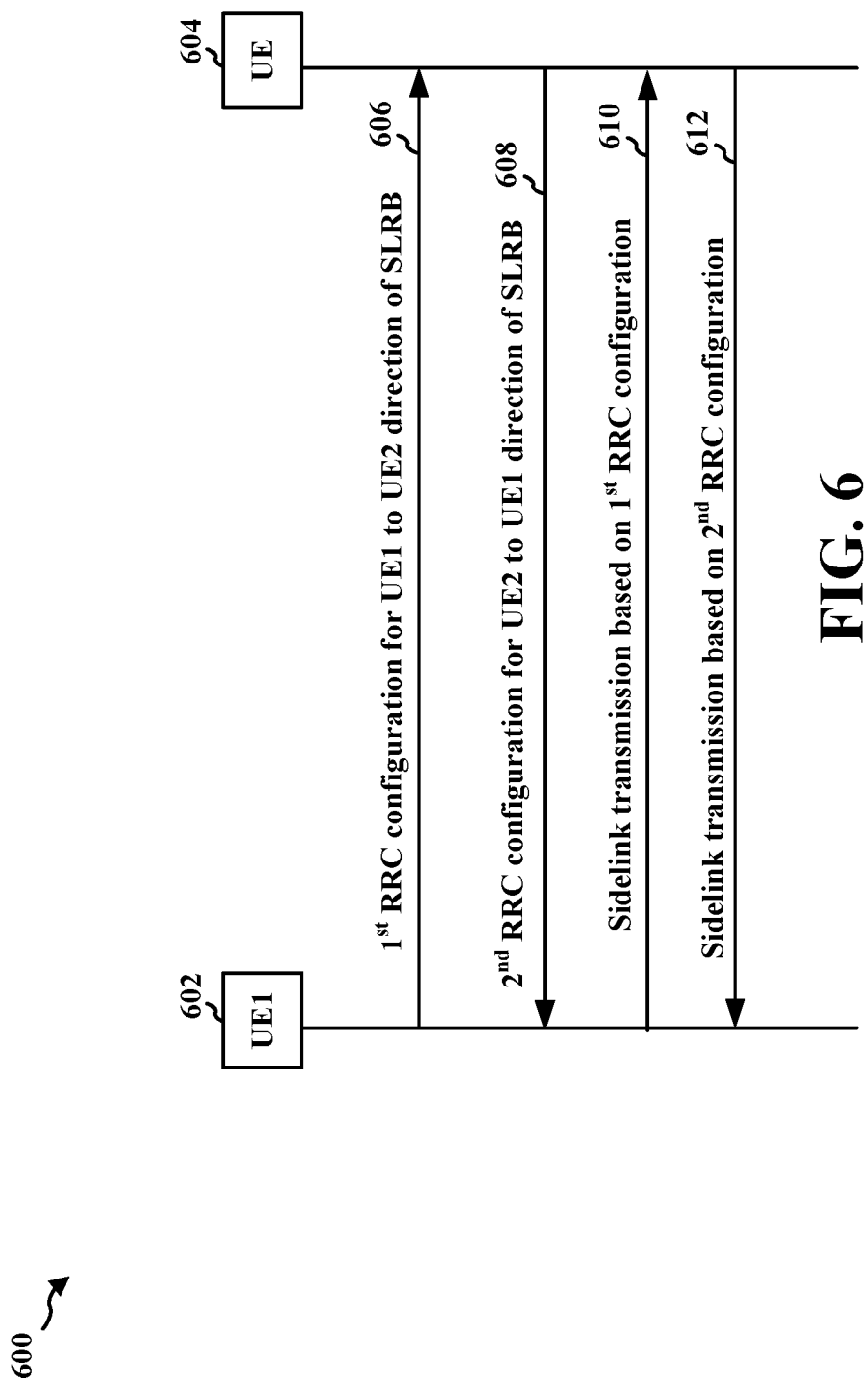
FIG. 6 illustrates example aspects of a communication flow including the exchange of RRC configuration information for sidelink communication between two UEs.

FIG. 5A illustrate that a sidelink DRX configuration may be configured for a first UE, and a different sidelink DRX configuration may be configured for the second UE. In the time diagram 500 in FIG. 5A, the DRX ON durations of the sidelink DRX configurations for the two UEs do not overlap. In FIG. 5B, the time diagram 550 shows an overlap between the sidelink DRX configurations for the two UEs. The DRX configuration information may be exchanged between the UEs in RRC signaling on PC5 interface (i.e. sidelink). A sidelink RRC procedure, e.g., a PC5 RRC procedure, may be performed per direction of the sidelink communication. For example, as shown in the example communication flow 600 of FIG. 6, UE 1 602 may signal a sidelink RRC configuration information 606, e.g., PC5 RRC configuration information, for a sidelink radio bearer (SLRB) configuration for the direction from UE1 602 to UE2 604. Likewise, UE2 604 may signal an PC5 RRC configuration information 608, e.g., a PC5 RRC configuration information, for an SLRB configuration for the direction from UE2 602 to UE 1604. The UE 1 602 may transmit sidelink communication 610 based on the first RRC configuration that the UE1 602 signaled at 606. The UE2 604 may transmit sidelink communication 612 based on the second RRC configuration that the UE2 604 signaled at 608.

Similarly, a sidelink DRX configuration may be configured in PC5 RRC signaling in a directional manner between a pair of UEs. For example, the RRC configuration information 606 may include sidelink DRX configuration information for a DRX cycle of UE1 602, e.g., a directional sidelink DRX configuration for the UE1 602 as a transmitting UE (which may be referred to as transmission-centric or Tx-centric) or as a receiving UE (e.g., which may be referred to as receiving-centric or Rx-centric). Similarly, the RRC configuration information 608 may include sidelink DRX configuration information for a DRX cycle of UE2 604, e.g., a directional sidelink DRX configuration for the UE2 604 as a transmitting UE (which may be referred to as Tx-centric) or as a receiving UE (e.g., which may be referred to as Rx-centric). However, the DRX configuration of UE1 602 will affect the timing at which UE2 604 is to receive communication from UE1 602 and/or the timing at which UE2 604 is to transmit communication to the UE1 602. Similarly, the DRX configuration of UE2 604 may affect the ability of UE1 to take advantage of a DRX OFF duration. For example, in FIG. 5A, the ON duration for UE1 does not overlap with the ON duration for UE2. In order for UE2 to transmit to UE1 during UE1's ON duration, UE2 may also need to be in an ON duration or not have a conflict with other communication. Similarly, an overlap between the ON duration of UE1 and the ON duration of UE2 may enable UE1 to be awake to receive sidelink communication from UE2 that the UE2 may transmit during its ON duration. Aspects presented herein provide for information to be included in configuration messages between UEs to coordinate sidelink DRX configurations for the UEs. As well, aspects presented herein enable the UEs to negotiate a sidelink DRX configuration in order to establish a sidelink DRX configuration that satisfies Quality of Service (QoS) and/or power saving preferences for both UEs.

Figure 7:
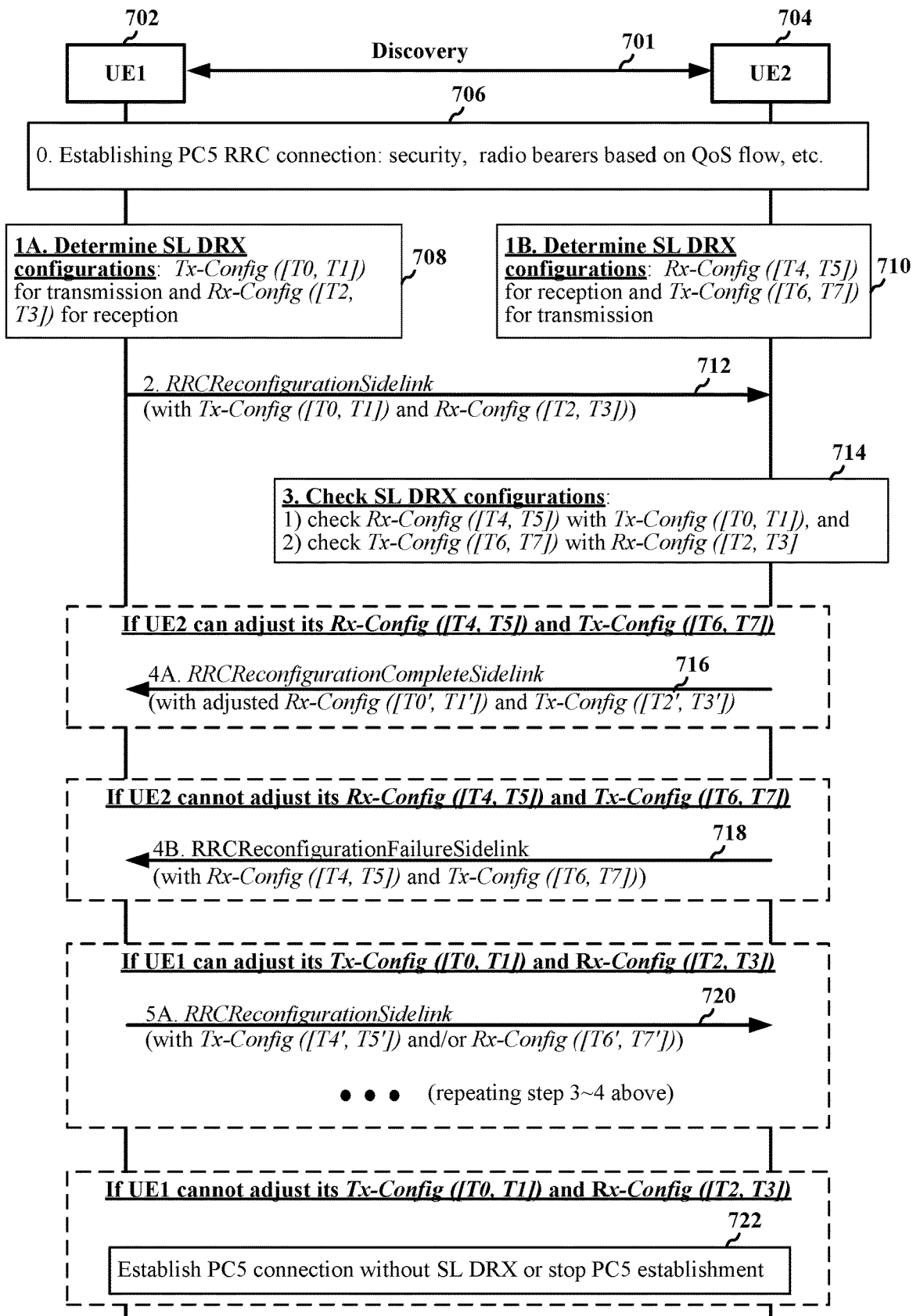
FIG. 7 illustrates an example communication flow including the negotiation of sidelink DRX configuration information between two UEs as a part of establishing an RRC connection.
Figure 8:
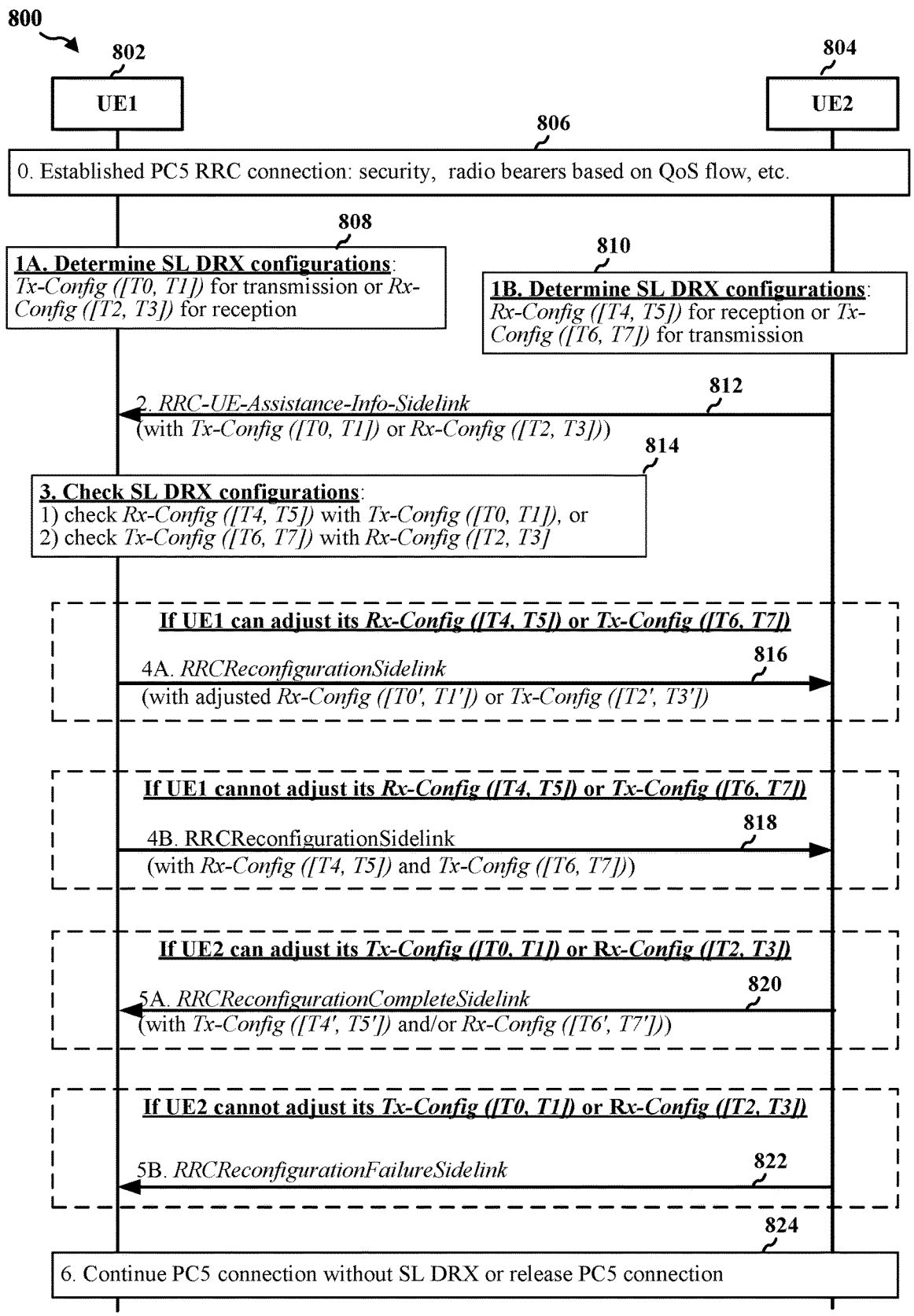
FIG. 8 illustrates an example communication flow including the negotiation of sidelink DRX configuration information between two UEs after establishing an RRC connection.

FIGS. 7 and 8 illustrate example aspects of communication flows 700 and 800 between two UEs to configure a directional sidelink DRX configuration for a unicast link between two UEs. FIG. 7 illustrates an example in which the sidelink DRX configuration may be performed during establishment of a sidelink connection between the two UEs, e.g., during a PC5 connection establishment. As illustrated at 706, UE1 702 and UE2 704 may exchange information to establish a PC5 RRC connection. The connection may be for a sidelink unicast link between the UE1 702 and the UE2 704. As part of establishing the PC5 RRC connection, the UEs may exchange various types of information on PC5 including the exchange of UE's capability information, exchange of configuration information, exchange of security information, exchange of information about radio bearers based on QoS, etc. As well, the UEs may perform a discovery procedure, at 701, prior to beginning to establish the PC5 RRC connection at 706.

UE1 702 may be referred as an initiating UE that initiates a directional sidelink DRX configuration for UE1. UE2 704 may be referred to as a responding UE that may confirm or reject the directional sidelink DRX configuration for the UE1 702.

Together, the UEs (e.g., UE1 702 and UE2 704) may determine a sidelink DRX configuration for transmission by UE1 702 (e.g., which may be referred to as a "Tx-Config") and/or a sidelink DRX configuration for reception by UE1 702 (e.g., which may be referred to as a "Rx-Config"). A UE may determine its sidelink DRX configuration(s) based on its capability, QoS requirements for the unicast (e.g., latency or packet delay budget, data rate, data packet size, reliability, etc.), configured sidelink DRX parameters or configuration, established sidelink DRX configurations for one or more PC5 connections in the proximity of the UE, and/or other UE's information received (e.g., other UE's capability message or other UE's assistance information message, which may contain capability, QoS requirements and/or configured or established sidelink DRX configurations). In some aspects, the sidelink DRX parameters and/or the sidelink DRX configuration may be preconfigured or configured prior to the UEs establishing a sidelink connection.

As illustrated at 708, the UE 1 702 may determine parameters for a directional sidelink DRX configuration for the UE1. The sidelink DRX configuration parameters may include a starting point (T0) and ending point (T1) of a DRX ON duration or an ON timer with associated offset configuration for a DRX ON duration for DRX transmission from the UE1. The DRX configuration for transmission from the UE1 702 may be indicated as Tx-Config ([T0, T1] a time interval with the system's time reference or a time interval within a DRX cycle). The sidelink DRX configuration parameters may include a starting point (T2) and ending point (T3) of a DRX ON duration or an ON timer with associated offset configuration for a DRX ON duration for DRX reception from the UE1. The DRX configuration for reception by the UE1 702 may be indicated as Rx-Config ([T2, T3] a time interval with the system's time reference or a time interval within a DRX cycle). FIGS. 5A and 5B illustrate examples of T0, T1 for a DRX ON duration for transmission by the UE. As illustrated in FIG. 5A, the DRX ON duration may additionally, or alternatively, correspond to T2, T3 for reception by the UE. For example, if the UE supports full duplex communication, T0 may be the same as T2, and/or T2 may be the same as T3. For half-duplex communication, the DRX ON duration may correspond to only [T0, T1] or [T2, T3].

Similarly, the UE2 704 may determine parameters for a directional sidelink DRX configuration for the UE2. The sidelink DRX configuration parameters may include a starting point (T6) and ending point (T7) of a DRX ON duration or an ON timer configuration for a DRX ON duration for DRX transmission from the UE2. In case the DRX ON duration or ON timer configuration is used, the starting point may be implicit, or included explicitly as part of the DRX configuration. The DRX configuration for transmission from the UE2 704 may be indicated as Tx-Config ([T6, T7] a time interval with the system's time reference or a time interval within a DRX cycle). The sidelink DRX configuration parameters may include a starting point (T4) and ending point (T5) of a DRX ON duration or an ON timer configuration for a DRX ON duration for DRX reception by the UE2. The DRX configuration for reception by the UE2 704 may be indicated as Rx-Config ([T4, T5] a time interval with the system's time reference or a time interval within a DRX cycle). FIGS. 5A and 5B illustrate examples of T4, T5 for a DRX ON duration of UE2.

At 712, the initiating UE (e.g., UE1 702) may send an RRC reconfiguration message (which may be referred to as an "RRCReconfigurationSidelink message") with the sidelink DRX configuration information Tx-Config ([T0, T1]) for UE1's DRX transmission and Rx-Config ([T2, T3]) for UE1's DRX reception. The UE1 702 may indicate in the message whether or not the Tx-Config and/or Rx-Config is flexible/negotiable with the UE2.

Additionally, or alternatively, the UE1 702 may indicate, in the message, the corresponding DRX-cycle-period –Tx (T) and DRX-cycle-period –Rx(T) (e.g., DRX cycle 520 as shown in FIG. 5A) based on QoS flow or requirements, e.g., latency or packet delay budget. In some aspects, there may be a common DRX cycle for sidelink communication, and the responding UE (e.g., UE2) may be able to determine the DRX configuration of UE1 based on [T0, T1] and/or, or [T2, T3] and the common DRX cycle. In other aspects, there may be a particular DRX cycle associated with [T0, T1]. Depending on the capabilities of UE1, the time duration that starts with T0 and extends to T1 may overlap with the time duration that starts with T2 and ends with T3. For example, if the UE1 supports full-duplex communication with overlapping transmission and reception, the times DRX ON duration for transmission may overlap with the DRX ON duration for reception. If the UE1 does not support full-duplex communication, the DRX ON durations may not overlap, e.g., in order to provide for half-duplex communication at the UE1.

Additionally, or alternatively, the UE 1 702 may indicate, in the message, 712 an offset (e.g., DRX ON offset 510 as shown in FIG. 5A) for starting the sidelink transmission from the UE1 and/or a second offset (e.g., DRX ON offset) for starting the sidelink reception by the UE1.

UE2 704 may be referred to as the responding UE. As illustrated at 714, the UE2 704 may check its own Rx-Config ([T4, T5]) to see whether it covers [T0, T1], e.g., overlaps at least partially with [T0, T1]. If ([T4, T5]) does not overlap in time with [T0, T1], such as illustrated in the example in FIG. 5A, the UE 2 may further consider whether it can it adjust its Rx-Config ([T4, T5]) to allow it to cover [T0, T1], e.g., provide an overlap with UE1's Tx-Config ([T0, T1]). Similarly, the UE2 may check its own Tx-Config ([T6, T7]), to see whether it falls within [T2, T3]. If not, the UE2 may determine whether its Tx-Config ([T6, T7]) is adjustable to allow it to be within [T2, T3]. The UE2 704 may have other connections with other UEs and/or with a network, which may affect the ability of UE2 to adjust its DRX timing parameters.

Additionally, or alternatively, UE2 704 may further consider whether it can it adjust its DRX cycle (e.g., DRX cycle 522 as shown in FIG. 5A) for reception and/or transmission for the DRX alignment between UE1 and UE2.

Additionally, or alternatively, UE2 704 may further consider whether it can it adjust its DRX Offset (e.g., Offset 512 as shown in FIG. 5A) for reception and/or transmission for the ON duration alignment between UE1 and UE2.

If UE2 determines that it supports the DRX configuration indicated by the UE1, the UE2 may respond with a message confirming the sidelink DRX configuration for UE1, e.g., in a sidelink RRC reconfiguration complete message 716. In some aspects, the UE2 704 may transmit the RRCReconfigurationCompleteSidelink message with adjusted configuration information for the reception/transmission DRX configuration for UE1 702. The UE2 may transmit the message 716 if the answer to questions 1 and 2 in 714 are yes, for example. For example, the UE2 may indicate an adjusted Rx-Config ([T0', T1']) and/or adjusted Tx-Config ([T2', T3'] to UE1. As illustrated in FIG. 5B, the time duration for the Rx-Config ([T4, T5]) for UE2 may overlap in time with the Tx-Config ([T0, T1]) of UE1. The UE2 704 may indicate an adjusted DRX timing for the UE, e.g., based on T0 and/or T1. In some aspects, [T0', T1'] may be the same as [T0, T1], or within the range of [T0, T1]. In such aspects, T0' is the adjusted starting point that is the same or larger than T0 and T1' is the adjusted ending point that is the same or smaller than T1. FIG. 5B illustrates an example in which T3' is the same as T3, for example. FIG. 5B also illustrates examples in which T0' is different than T0, T1' is different than T1, and T2 is different than T2'. The UE1 702 and the UE2 704 may continue to establish the sidelink RRC connection including the sidelink DRX configuration based on Tx-Config ([T0', T1']) and/or Rx-Config ([T2', T3'] for UE1 and Rx-Config ([T0', T1']) and/or Tx-Config ([T2', T3'] for UE2. The UE1 may wake up to transmit or receive according to the corresponding DRX ON duration of the DRX configuration and may enter a lower power mode or a sleep mode in which it does not, or limits, transmit/receive during a corresponding OFF duration. Additionally, or alternatively, the adjusted Tx-Config ([T0', T1']) and/or Rx-Config ([T2', T3']) may be based on adjusting the ON timer for transmission on duration and the associated on duration offset and adjusting the ON timer for reception on duration and the associated on duration offset respectively. Additionally, or alternatively, the adjusted Tx-Config ([T0', T1']) and/or Rx-Config ([T2', T3']) may also be based on adjusting the DRX cycle length for transmission and DRX cycle length for reception respectively.

If the UE2 704 determines, at 714, that it cannot use the DRX configuration indicated by the UE1 702, e.g., if the answer to either of question 1 or question 2 is no, the UE2 704 may transmit a failure message rejecting the indicated DRX configuration for UE1, e.g., an RRC reconfiguration failure message (which may be referred to as an "RRCReconfigurationFailureSidelink message"). In some aspects, the UE2 may indicate a different DRX configuration with different DRX timing parameters for the UE1. For example, the UE2 may respond with its sidelink DRX configuration parameters (e.g. with Rx-Config ([T4, T5]) and Tx-Config ([T6, T7] for reception on duration and transmission on duration respectively), at 718. In some aspects, the UE2 may indicate the different timing parameters if the UE1 indicated in the message 712 that the parameters were flexible or negotiable.

In response to the message 714, the UE1 702 may determine whether it can adjust its DRX configuration based on the parameters Rx-Config ([T4, T5]) and Tx-Config ([T6, T7]) that were received from the UE2 704. For example, the UE1 702 may determine whether it can adjust its Rx on duration [T2, T3] based on UE2's Tx on duration [T6 T7] and/or whether it can adjust its Tx on duration [T0, T1] based on UE2's Rx on duration [T3, T4]. If the UE1 702 determines that it can adjust its Tx-Config or Rx-Config, the UEs may continue to establish the RRC connection with the DRX configuration Tx-Config[T3, T4] and/or Rx-Config [T6, T7]. The UE1 may transmit an RRC message to the UE2 indicated confirmation or acceptance of the indicated DRX configuration parameters for UE1.

Similar to the description of the adjusted timing parameters [T0', T1'] described in connection with 716, the UE1 may respond to the message 718 by transmitting the RRC reconfiguration message 720 indicating an adjusted timing for [T4', T5'] and/or [T6', T7'] that falls within or are the same as the timing parameters Rx-Config ([T4, T5]) and Tx-Config ([T6, T7]) received from the UE2. For example, the UE1 may transmit 720 with an indication of one or more of Tx-Config ([T4', T5']) and Rx-Config ([T6', T7']). Additionally, or alternatively, the adjusted Tx-Config ([T4', T5']) and/or Rx-Config ([T6', T7']) may be based on adjusting the ON timer for transmission on duration and the associated on duration offset and adjusting the ON timer for reception on duration and the associated on duration offset respectively. Additionally, or alternatively, the adjusted Tx-Config ([T0', T1']) and/or Rx-Config ([T2', T3']) may also be based on adjusting the DRX cycle length for transmission and DRX cycle length for reception respectively. The UE1 and the UE2 may continue to respond with RRC messages either proposing new times and/or proposing adjusted times for the DRX configuration for UE1. Thus, the UEs may proceed through multiple iterations of the described messaging exchange before confirming a directional sidelink DRX configuration for the UE 1702.

If the sidelink DRX configuration is rejected, the PC5 connection may be established with a default or fallback common sidelink DRX (pre-)configured or without sidelink DRX, or the PC5 connection establishment may be stopped, as illustrated at 722. For example, step 722 may be performed based on whether or not the Tx-Config and/or the Rx-Config are flexible. If the time parameters are not flexible (i.e. not negotiable), the UE1 and UE2 may proceed to 722 upon receiving a failure/rejection message, such as at 718.

FIG. 8 illustrates an example communication flow 800 in which the sidelink DRX configuration is performed, or updated, during or after the establishment of the sidelink connection, e.g. PC5 connection, at 806. The RRC establishment may include any of the aspects described in connection with 706 in FIG. 7. Additionally, the RRC establishment, at 806, may include a configuration (or agreement on a configuration) for sidelink DRX for the UE1, e.g., based on any of the aspects described in connection with FIG. 7. In other aspects, the RRC connection may be established with a default or fallback common sidelink DRX (pre-)configured or without sidelink DRX.

At 808 and 810, the UE 1 and the UE2 may each determine parameters for a directional sidelink DRX configuration, as described in connection with 708 and 710 in FIG. 7.

The initiating UE (e.g., UE1 802) may receive an assistance information message 812 from another UE (e.g., UE2 804) to initiate the sidelink DRX configuration/configuration update for the UE1 802. The assistance information message may be referred to as a "RRC-UE-Assistance-Info-Sidelink message" and may include Tx-Config ([T0, T1]) or an ON timer and associated offset for UE1 transmission on duration and/or Rx-Config ([T2, T3]) or an ON timer and associated offset for UE1 reception on duration, based on UE2's capability, power saving requirements, QoS requirements, (pre-)configuration sidelink DRX, and/or sidelink DRX for PC5 connections with other UEs in proximity, as described in connection with the parameter information in 712 in FIG. 7. Additionally, the message 812 may indicate a corresponding DRX cycle period, e.g., DRX-cycle-period −Tx(T) and/or DRX-cycle-period −Rx(T'), as described in connection with FIG. 7. Additionally, or alternatively, the assistance information may be contained within the UE2's sidelink UE capability message during establishing PC5 connection, and it may include power saving requirements, QoS requirements, (pre-)configured sidelink DRX.

The initiating UE, UE1 802 may check, at 814, its own Rx-Config ([T4, T5]), with [T0, T1] or its Tx-Config ([T6, T7]) with [T2, T3], to determine whether the UE1 can adjust its Rx-Config ([T4,T5]) based on [T0, T1] or its Tx-Config ([T6,T7]) based on [T2, T3]. The determination may include similar determinations to those described in connection with 714 in FIG. 7.

If the UE1 802 determines that it can use the DRX timing indicated by the UE2 to communicate with the UE2 and/or determines that it can use an adjusted DRX timing to communicate with the UE2, the UE1 802 may send an RRC configuration message, e.g., 816, indicating the DRX timing/adjusted DRX timing for communication with the UE2. For example, the UE1 802 may send an "RRCReconfigurationSidelink message" to the UE2 804. The message 816 with the adjusted Rx-Config ([T0', T1']) or Tx-Config ([T2', T3] to UE1 802), if it can adjust its Rx-Config ([T4, T5]) to be within, or the same as, [T0, T1] or its Tx-Config ([T6,T7]) to be within, or the same as, [T2, T3], e.g., as described in connection with FIG. 5B or FIG. 7. The message 816 may include associated DRX-cycle period information and/or offset information, e.g., as described in connection with the message 712 in FIG. 7.

The UE2 804 may respond to the message 816 by transmitting an RRC configuration complete message 820 indicating a confirmation or acceptance of the sidelink DRX parameters indicated by the UE1, e.g., if the UE2 can adjust its Tx-Config or Rx-Config accordingly. The message may be referred to as an "RRCReconfigurationCompleteSidelink message."

The UE2 804 may respond to the message 816 by transmitting an RRC failure message 822 indicating that the UE2 rejects the sidelink DRX parameters indicated by the UE1 802 in the message 818, e.g., if the UE2 804 cannot adjust its Tx-Config or Rx-Config according to the timing parameters indicated by the UE 1 802. The message 822 may be referred to as an "RRCReconfigurationFailureSidelink message."

In some aspects, the UE1 802 may transmit an RRC configuration message 818 (e.g., which may be referred to as an "RRCReconfigurationSidelink message") with different DRX timing parameters than those indicated by the UE2 804. The inclusion of the different timing parameters may indicate that the UE assistance information, e.g., 812, cannot be used by the UE1 802, e.g., if the UE1 cannot adjust its Rx-Config ([T4, T5]) to overlap with [T0, T1] or its Tx-Config ([T6, T7]) to overlap with [T2, T3]. For example, as described in connection with 718 in FIG. 7, the UE 1 may send different DRX timing parameters Rx-Config ([T4, T5]) and Tx-Config ([T6, T7]) to the UE2 804.

The UE2 804 may respond to the message 818 by transmitting an RRC configuration complete message 820 indicating a confirmation or acceptance of the sidelink DRX parameters indicated by the UE1, e.g., if the UE2 can adjust its Tx-Config or Rx-Config accordingly. The message may be referred to as an "RRCReconfigurationCompleteSidelink message."

The UE2 804 may respond to the message 818 by transmitting an RRC failure message 822 indicating that the UE2 rejects the sidelink DRX parameters indicated by the UE1 802 in the message 816, e.g., if the UE2 804 cannot adjust its Tx-Config ([T4', T5']) or Rx-Config ([T6', T7']) according to the timing parameters indicated by the UE1 802. The message 822 may be referred to as an "RRCReconfigurationFailureSidelink message."

Thus, in FIG. 8, if the sidelink DRX configuration is rejected, the PC5 connection may be continued with a default or fall back sidelink DRX or without sidelink DRX, or the PC5 connection may be released, e.g., as illustrated at 824.

In some aspects, in addition to the configurations for sidelink DRX cycle length, ON timer for on duration and offset for on duration starting point, a configuration (e.g., Tx-Config or Rx-Config) carried on either RRC Configuration message (e.g., which may be referred to as an "RRCReconfigurationSidelink message") or UE Assistance Information message (e.g., which may be referred to as an "RRC-UE-Assistance-Info-Sidelink message") may further contain configurations for an Inactivity timer, HARQ RTT timer and HARQ retransmission timer if HARQ is enabled, and the UEs may negotiate one or multiple suitable values for each based on UE capability, QoS requirement, power saving requirement, etc.

In some aspects, if a configuration (e.g., Tx-Config or Rx-Config) carried on either RRC Configuration message (e.g., which may be referred to as an "RRCReconfigurationSidelink message") or UE Assistance Information message (e.g., which may be referred to as an "RRC-UE-Assistance-Info-Sidelink message") is a sidelink DRX configuration or a UE's assistance information for sidelink DRX configuration may be explicitly indicated in the RRC Configuration message or UE Assistance Information message, e.g., a flag bit; may be implicitly indicated based on the directional sidelink DRX configuration. For example, if Tx-Config is a sidelink DRX configuration for transmission (e.g., Tx-centric), the Rx-Config may be a UE's assistance information for the other UE's sidelink DRX configuration for transmission; if Rx-Config is a sidelink DRX configuration for reception (e.g., Rx-centric), the Tx-Config may be a UE's assistance information for the other UE's sidelink DRX configuration for reception. As another example, if only one configuration (e.g., Tx-Config or Rx-Config) is indicated in an RRC Configuration message, this configuration may be a sidelink DRX configuration; if only one configuration (e.g., Tx-Config or Rx-Config) is indicated in a UE Assistance Information message, this configuration may be a UE's assistance information for sidelink DRX configuration.

In some aspects, a UE may be configured as the UE determining a sidelink DRX configuration, i.e. a primary role, and a UE may default to the UE determining a sidelink DRX configuration, e.g., the UE initiating radio bearer(s) or initiating an RRC configuration, i.e. a primary role. If a UE determines a sidelink DRX configuration, it may set up a sidelink DRX configuration via RRC configuration message (e.g., which may be referred to as an "RRCReconfigurationSidelink message") and indicate if negotiating is allowed or not. If negotiation is not allowed, the other UE may accept the sidelink DRX accordingly. If negotiation is allowed, the UE determining a sidelink DRX configuration may decide if a sidelink DRX configuration must be taken or not during the negotiation process, and the other UE may accept the sidelink DRX accordingly. For example, if each UE determines its sidelink DRX for transmission, UE1 may indicate its Tx-config to UE2 and UE2 may set its Rx-config accordingly; similarly, UE2 may indicate its Tx-config to UE1 and UE1 may set its Rx-config accordingly. For another example, if each UE determines its sidelink DRX for reception, UE1 may indicate its Rx-config to UE2 and UE2 may set its Tx-config accordingly; similarly, UE2 may indicate its Rx-config to UE1 and UE1 may set its Tx-config accordingly.

In some aspects, the configuration may be performed with a single round of PC5-RRC signaling. For example, rather than the UE2 804 sending the UE assistance information in the message 812, the UE1 may send similar UE assistance information together with the RRCReconfigurationSidelink message 816. The UE2 804 may then respond with the message 820 or 822. Thus, in some aspects, the information in message 812 and 816 may be transmitted together in a single message from an initiating UE, e.g., from UE1, rather than the UE2 804 transmitting the UE assistance information, e.g., 812, and the UE1 802 responding with the RRCReconfigurationSidelink message, e.g., 816.

In some aspects, a UE may be under a base station's management, e.g., UE 104 under management of a base station 102 or 180 as shown in FIG. 1. In this case, the base station may determine sidelink DRX either for transmission (e.g., Tx-centric) or for reception (e.g., Rx-centric) with or without the UE's assistance information. For example, a UE may send a UE assistance information to a base station, the UE assistance information may include UE's capability, UE's QoS and power saving requirements, and/or UE's suitable sidelink DRX configuration. As another example, a UE may send a UE assistance information to a base station, where the UE assistance information may be received from the other UE paired for a unicast on PC5 and the UE assistance information may include the other UE's capability, the other UE's QoS and power saving requirements, the other UE's suitable sidelink DRX configuration and/or other UE's sidelink DRX configuration sent from another base station with which the other UE is connected.

In some aspects, a UE may be under a base station's management, e.g., UE 104 under management of a base station 102 or 180 as shown in FIG. 1. In this case, the base station may configure sidelink DRX either for transmission (e.g., Tx-centric) or for reception (e.g., Rx-centric) based on the determined sidelink DRX configuration.

In some aspects, both UEs communicating on the PC5 link under the same base station's management (e.g., UE 104 and base station 102 in FIG. 1) may receive sidelink configuration for transmission and/or reception (e.g., Tx-config1 and Rx-config1 received by UE1 and Rx-config2 and Tx-config2 received by UE2) from the base station (e.g., which may be referred to as an "RRCReconfiguration message" on Uu interface) and the base station may cooperate the alignment between UEs' sidelink DRX configuration, e.g., Rx-config2 corresponding to Tx-config1 and Tx-config2 corresponding to Rx-config1.

In some aspects, only one of the UEs communicating on PC5 link under the base station's management (e.g., UE 104 and base station 102 in FIG. 1) may receive a sidelink configuration for transmission and/or reception (e.g., Tx-config1 and Rx-config1 received by UE1), and the UE may send its sidelink DRX configuration to the other UE which may be out of base station's coverage. The other UE may accept or reject the configuration. If rejected, the UE that initially received the configuration (e.g., UE1) may report the rejection to the base station. The base station may adjust the configuration accordingly and resend the sidelink configuration to the UE (e.g., UE1).

In some aspects, one of the UEs communicating on the PC5 link may be under one base station's management, and the other of the UEs communicating on the PC5 link may be under another base station's management. In this case, both UEs may receive sidelink configurations for transmission and/or reception (e.g., Tx-config1 and Rx-config1 received by UE1 and Rx-config2 and Tx-config2 received by UE2) and the sidelink configurations may not align with each other. The UEs may negotiate the final sidelink DRX configuration on PC5 link as shown in FIGS. 7 and 8, or one UE may decide the final sidelink DRX configuration as described previously for a UE determining a sidelink DRX configuration. A UE may send its adjusted or suitable sidelink DRX configuration to its base station accordingly, and the base station may adjust the configuration accordingly and resend the sidelink configuration to the UE.

Figure 9:
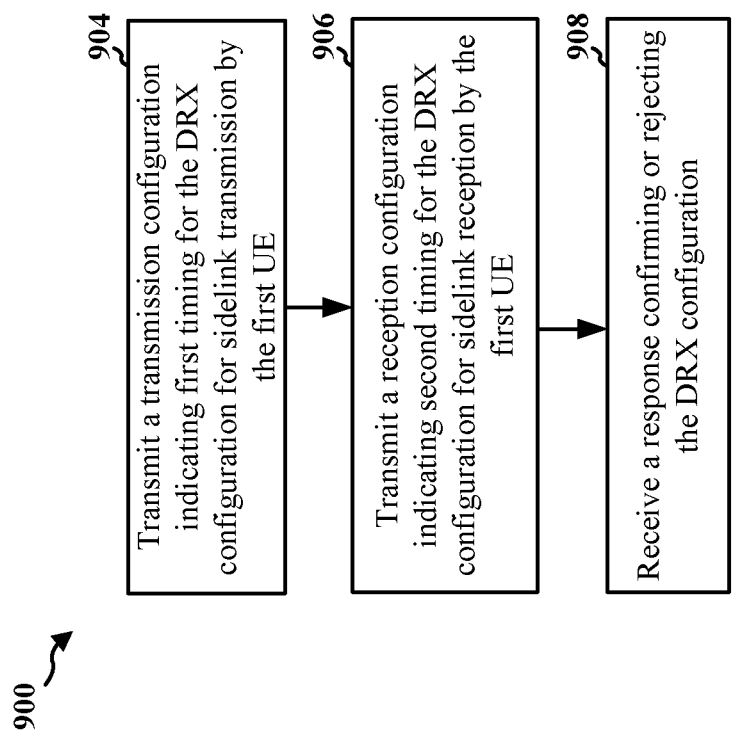
FIG. 9 is a flowchart of a method of wireless communication including the negotiation of sidelink DRX configuration information between two UEs.

FIG. 9 is a flowchart 900 of a method of wireless communication. The method may be performed by a UE (e.g., the UE 104, 402, 602, 702, 804; the device 310, 350; the apparatus 1302). The method may enable the UE to initiate a directional sidelink DRX configuration for the UE.

At 904, the UE transmits, to a second UE, a transmission configuration indicating first timing information for a DRX configuration for sidelink transmission from the first UE. At 906, the UE transmits, to the second UE, a reception configuration indicating second timing information for the DRX configuration for sidelink reception by the first UE. In some aspects, the transmission at 904 and 906 may be comprised in a single message, e.g., the message 712 or 816 described in connection with FIG. 7 or FIG. 8. The transmission configuration with the first timing information and the reception configuration with the second timing information may be transmitted in an RRC message for sidelink RRC reconfiguration, which may be referred to as an RRCReconfigurationSidelink message. The transmissions may be performed, e.g. by the sidelink DRX configuration component 1340 via the transmission component 1334 and/or the RF transceiver 1322 in the apparatus 1302 in FIG. 13.

The first timing information may include a first starting point and a first ending point for a DRX ON duration within a transmission DRX cycle and the second timing information includes a second starting point and a second ending point for the DRX on duration within a reception DRX cycle. The starting point and ending point may be based on any of the aspects described in connection with FIGS. 5A, 5B, 7, and/or 8. For example, as described in connection with FIG. 7, a message 712 may include Tx-Config ([T0, T1]) and/or Rx-Config ([T2,T3]). As another example, as described in connection with FIG. 8, a message 816 may include Tx-Config ([T4, T5]) and/or Rx-Config ([T6,T7]).

The transmission configuration may further include a transmission DRX cycle period for the sidelink transmission from the first UE and the reception configuration further includes a reception DRX cycle period for the sidelink reception by the first UE. For example, the message may further indicate DRX-cycle-period-Tx(T) and RX-cycle-period-Rx(T), e.g., as described in connection with 712 and/or 816 in FIGS. 7 and/or 8.

The transmission configuration may further include a first offset (e.g., DRX ON offset) for starting the sidelink transmission from the first UE and the reception configuration further includes a second offset (e.g., DRX ON offset) for starting the sidelink reception by the first UE, e.g., as described in connection with 712 and/or 816 in FIGS. 7 and/or 8.

At 908, the UE receives a response from the second UE confirming or rejecting the DRX configuration. The response may be received in an RRC message, e.g., indicating that the RRC reconfiguration is complete or is a failure. The reception may be performed, e.g. by the sidelink DRX configuration response component 1342 via the reception component 1330 and/or the RF transceiver 1322 in the apparatus 1302 in FIG. 13.

Figure 10:
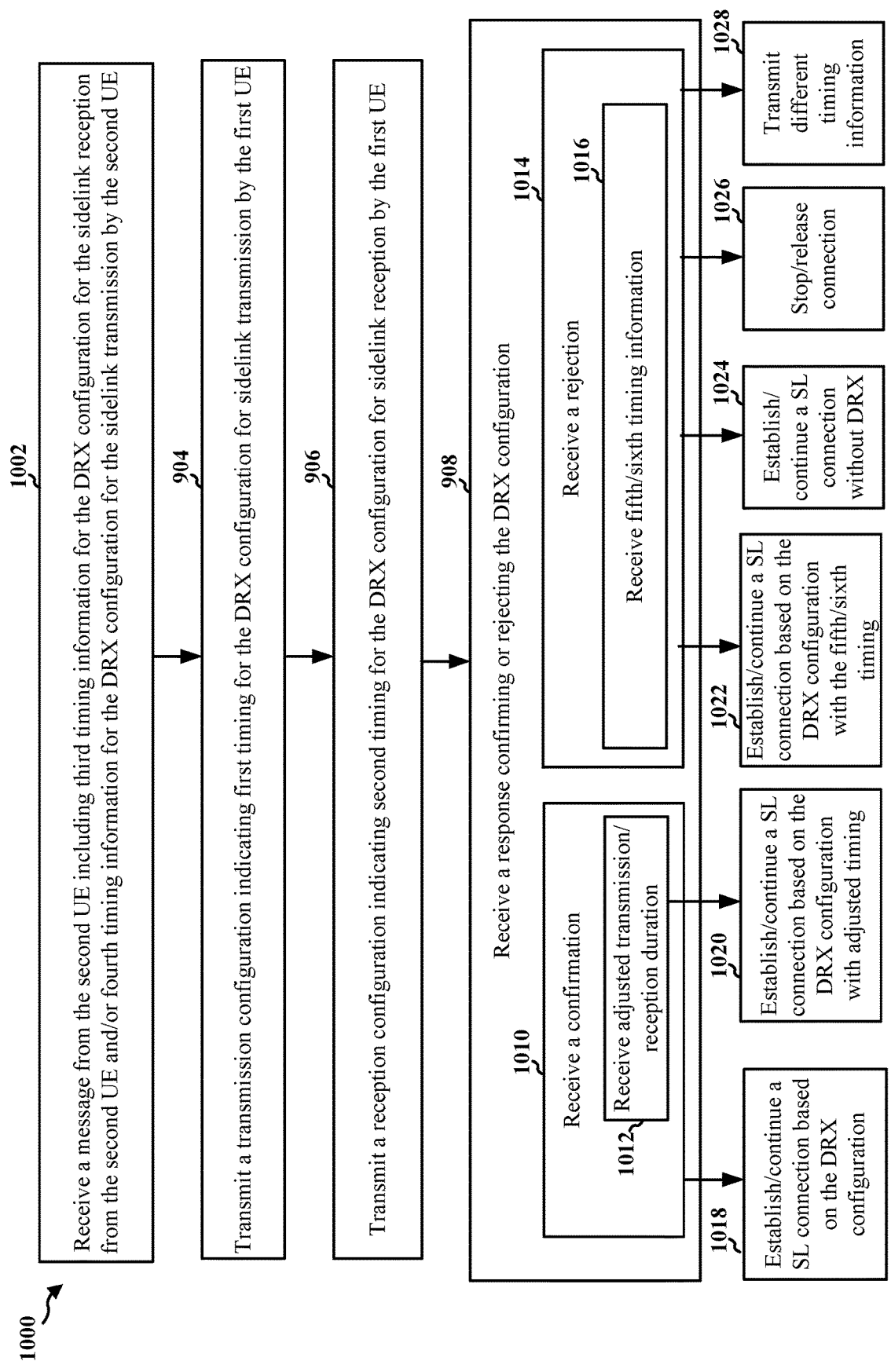
FIG. 10 is a flowchart of a method of wireless communication including the negotiation of sidelink DRX configuration information between two UEs.

FIG. 10 is a flowchart 1000 of a method of wireless communication. The method may be performed by a UE (e.g., the UE 104, 402, 602, 702, 804; the device 310, 350; the apparatus 1302) and may include the transmission of the transmission configuration, transmission of the reception configuration, and reception of a response confirming or rejecting the DRX configuration, e.g., as described in connection with 904, 906, and 908 in FIG. 9.

As illustrated at 1002, the UE may receive, prior to transmitting the transmission configuration or the reception configuration at 904 and 906, a message from the second UE including at least one of third timing information for the DRX configuration for the sidelink reception from the second UE and fourth timing information for the DRX configuration for the sidelink transmission by the second UE. The reception may be performed, e.g. by the assistance information component 1344 via the reception component 1330 and/or the RF transceiver 1322 in the apparatus 1302 in FIG. 13. The message from the second UE may comprise an RRC radio message including UE assistance information for sidelink, e.g., an "RRC-UE-Assistance-Info-Sidelink" message. FIG. 8 illustrates a UE (e.g., UE2 804) receiving the message 812 with the assistance information prior to transmitting the RRC reconfiguration message, e.g., 816, for example.

As illustrated at 1010, the response may comprise a confirmation of the DRX configuration, such as the RRCReconfigurationCompleteSidelink message, e.g., 716 in FIG. 7 or 820 in FIG. 8. At 918, the UE may establish a sidelink connection with the second UE based on the DRX configuration in response to receiving the confirmation, e.g., as described in connection with FIG. 7. Alternately, at 1018, the UE may continue a sidelink connection with the second UE based on the DRX configuration in response to receiving the confirmation, e.g., as described in connection with FIG. 8.

At 1010, the response may comprise a confirmation of the DRX configuration, such as the RRCReconfigurationCompleteSidelink message, e.g., 716 in FIG. 7 or 820 in FIG. 8. As illustrated at 1012, the UE may receive, in the response, at least one of an adjusted transmission duration based on the first timing information or an adjusted reception duration based on the second timing information. For example, the UE may receive an RRCReconfigurationCompleteSidelink message with [T0', T1'] and/or [T2',T3'], e.g., as described in connection with 716 in FIG. 7 or with 820 in FIG. 8.

At 1020, the UE may establish a sidelink connection with the second UE based on the adjusted transmission duration and the adjusted reception duration received from the second UE in response to receiving the confirmation, e.g., as described in connection with FIG. 7. Alternately, at 1018, the UE may continue a sidelink connection with the second UE based on the adjusted transmission duration and the adjusted reception duration received from the second UE in response to receiving the confirmation, e.g., as described in connection with FIG. 8. The sidelink RRC connection may be established or continued by the RRC component 1346 of the apparatus 1302 in FIG. 13.

As illustrated at 1014, the response may comprise a rejection of the DRX configuration. In such aspects, the UE may receive, in the response, at least one of fifth timing information (e.g., [T6, T7]) for the DRX configuration for the sidelink transmission from the second UE and sixth timing information (e.g., [T4, T5]) for the DRX configuration for the sidelink reception by the second UE. FIG. 7 illustrates an example of a message 718 that indicates different timing information. FIG. 8 illustrates an example of a message 820 that indicates different timing information.

As illustrated at 1022, the UE may establish or continue a sidelink connection with the second UE with DRX based on at least one of the third timing information or the fourth timing information received from the second UE, e.g., if the UE can use the timing information received at 1016. The sidelink RRC connection may be established or continued by the RRC component 1346 of the apparatus 1302 in FIG. 13.

As illustrated at 1024, the UE may establish or continue a sidelink connection with the second UE without DRX based on the first UE not supporting the third timing information or the fourth timing information indicated by the second UE. For example, FIG. 7 illustrates an example of the UE1 continuing the connection without DRX, at 722. FIG. 8 illustrates an example of the UE2 continuing the connection without DRX, at 824. The sidelink RRC connection may be established or continued by the RRC component 1346 of the apparatus 1302 in FIG. 13.

As illustrated at 1026, the UE may stop establishment of the sidelink connection with the second UE or release the sidelink connection with the second UE in response to the rejection of the DRX configuration based on the first UE not supporting the third timing information or the fourth timing information indicated by the second UE. For example, FIG. 7 illustrates an example of the UE1 stopping establishment of the connection without DRX, at 722. FIG. 8 illustrates an example of the UE2 releasing the connection without DRX, at 824. The establishment of the sidelink RRC connection may be stopped or the connection may be released by the RRC component 1346 of the apparatus 1302 in FIG. 13.

As illustrated at 1028, the UE may transmit, to the second UE, different timing information for the sidelink transmission or the sidelink reception of the first UE in response to the rejection. As illustrated at 720 in FIGS. 7 and 820 in FIG. 8, the UE1 may transmit adjusted timing information [T4', T5'] and/or [T6', T7']. Or, the UE may send a different time to begin another iteration of the DRX negotiation with the second UE. The transmission may be performed, e.g., by the sidelink DRX configuration component 1340 via the transmission component 1334 and/or the RF transceiver 1322 of the apparatus 1302 in FIG. 13.

In other aspects, the response may comprise a rejection of the DRX configuration, at 1014 without the timing information, at 1016. The UE may establish or continue a sidelink connection, at 1024, with the second UE without DRX in response to the rejection of the DRX configuration. The sidelink RRC connection may be established or continued by the RRC component 1346 of the apparatus 1302 in FIG. 13.

In other aspects, the response may comprise a rejection of the DRX configuration, at 1014 without the timing information, at 1016, and the UE may stop establishment of a sidelink connection with the second UE or release the sidelink connection with the second UE, at 1026, in response to the rejection of the DRX configuration. The establishment of the sidelink RRC connection may be stopped or the connection may be released by the RRC component 1346 of the apparatus 1302 in FIG. 13.

Figure 11:
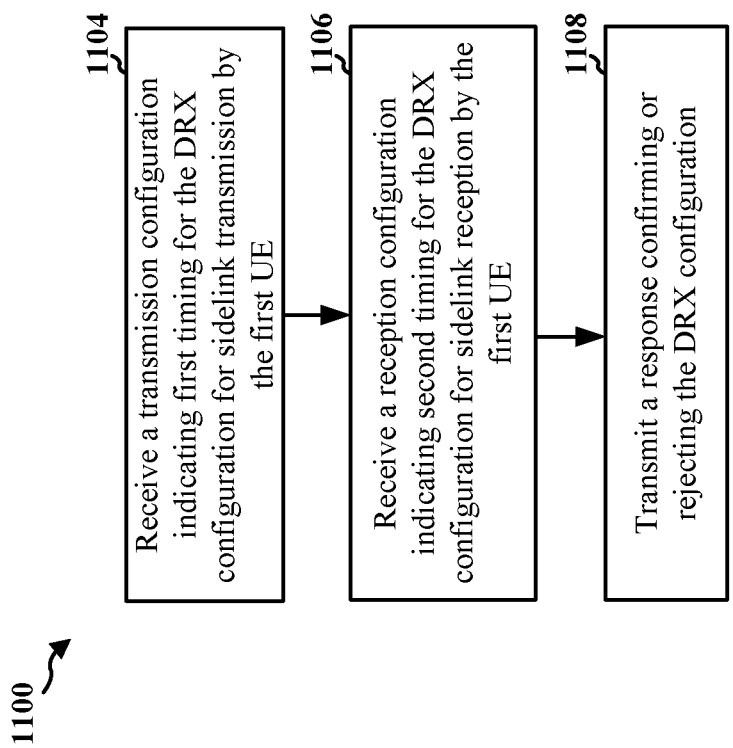
FIG. 11 is a flowchart of a method of wireless communication including the negotiation of sidelink DRX configuration information between two UEs.

FIG. 11 is a flowchart 1100 of a method of wireless communication. The method may be performed by a UE (e.g., the UE 104, 402, 604, 704, 802; the device 310, 350; the apparatus 1302). The method may enable the UE to negotiate directional sidelink DRX configuration.

At 1104, the UE receives, from the first UE, a transmission configuration indicating first timing information for a DRX configuration for sidelink transmission from the first UE. At 1106, the UE receives, from the first UE, a reception configuration indicating second timing information for the DRX configuration for sidelink reception by the first UE. In some aspects, the reception at 1104 and 1106 may include reception of a single message, e.g., the message 712 or 816 described in connection with FIG. 7 or FIG. 8. The transmission configuration with the first timing information and the reception configuration with the second timing information may be received in an RRC message for sidelink RRC reconfiguration, which may be referred to as an RRCReconfigurationSidelink message. The reception may be performed, e.g. by the sidelink DRX configuration component 1340 via the reception component 1330 and/or the RF transceiver 1322 in the apparatus 1302 in FIG. 13.

The first timing information may include a first starting point and a first ending point for a DRX ON duration within a transmission DRX cycle and the second timing information includes a second starting point and a second ending point for the DRX on duration within a reception DRX cycle. The starting point and ending point may be based on any of the aspects described in connection with FIGS. 5A, 5B, 7, and/or 8. For example, as described in connection with FIG. 7, a message 712 may include Tx-Config ([T0, T1]) and/or Rx-Config ([T2,T3]). As another example, as described in connection with FIG. 8, a message 816 may include Tx-Config ([T4, T5]) and/or Rx-Config ([T6,T7]).

The transmission configuration may further include a transmission DRX cycle period for the sidelink transmission from the first UE and the reception configuration further includes a reception DRX cycle period for the sidelink reception by the first UE. For example, the message may further indicate DRX-cycle-period-Tx(T) and RX-cycle-period-Rx(T), e.g., as described in connection with 712 and/or 816 in FIGS. 7 and/or 8.

The transmission configuration may further include a first offset (e.g., DRX ON offset) for starting the sidelink transmission from the first UE and the reception configuration further includes a second offset (e.g., DRX ON offset) for starting the sidelink reception by the first UE, e.g., as described in connection with 712 and/or 816 in FIGS. 7 and/or 8.

At 1108, the UE transmits a response to the first UE confirming or rejecting the DRX configuration. The response may be transmitted in an RRC message, e.g., indicating that the RRC reconfiguration is complete or is a failure. The transmission may be performed, e.g. by the sidelink DRX configuration response component 1342 via the transmission component 1334 and/or the RF transceiver 1322 in the apparatus 1302 in FIG. 13.

Figure 12:
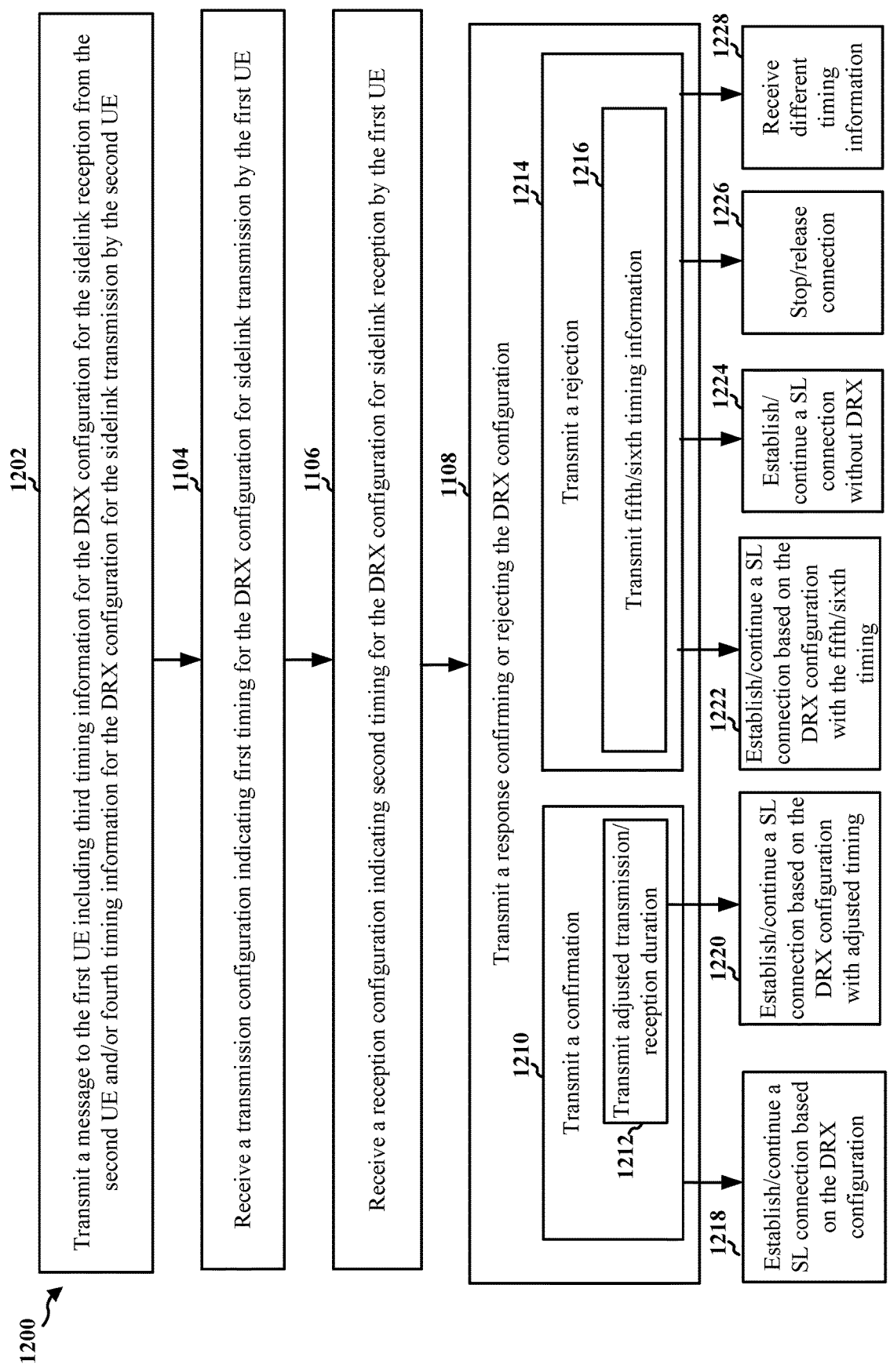
FIG. 12 is a flowchart of a method of wireless communication including the negotiation of sidelink DRX configuration information between two UEs.

FIG. 12 is a flowchart 1200 of a method of wireless communication. The method may be performed by a UE (e.g., the UE 104, 402, 604, 704, 802; the device 310, 350; the apparatus 1302). The method may enable the UE to negotiate directional sidelink DRX configuration. The method may include 1104, 1106, and 1108 from FIG. 11.

As illustrated at 1202, the UE may transmit, prior to receiving the transmission configuration or the reception configuration at 1004 and 1006, a message to the first UE including at least one of third timing information for the DRX configuration for the sidelink reception from the second UE and fourth timing information for the DRX configuration for the sidelink transmission by the second UE. The transmission may be performed, e.g. by the assistance information component 1344 via the transmission component 1334 and/or the RF transceiver 1322 in the apparatus 1302 in FIG. 13. The message may comprise an RRC radio message including UE assistance information for sidelink, e.g., an "RRC-UE-Assistance-Info-Sidelink" message. FIG. 8 illustrates a UE (e.g., UE1 802) transmitting the message 812 with the assistance information prior to receiving the RRC reconfiguration message, e.g., 816, for example.

As illustrated at 1210, the response may comprise a confirmation of the DRX configuration, such as the RRCReconfigurationCompleteSidelink message, e.g. 716, in FIG. 7 or 820 in FIG. 8. At 1218, the UE may establish a sidelink connection with the first UE based on the DRX configuration in response to transmitting the confirmation, e.g., as described in connection with FIG. 7. Alternately, at 1218, the UE may continue a sidelink connection with the first UE based on the DRX configuration after transmitting the confirmation, e.g., as described in connection with FIG. 8.

At 1210, the response may comprise a confirmation of the DRX configuration, such as the RRCReconfigurationCompleteSidelink message, e.g., 716 in FIG. 7 or 820 in FIG. 8. As illustrated at 1212, the UE may transmit, in the response, at least one of an adjusted transmission duration based on the first timing information or an adjusted reception duration based on the second timing information. For example, the UE may transmit an RRCReconfigurationCompleteSidelink message with [T0', T1'] and/or [T2',T3'], e.g., as described in connection with 716 in FIG. 7 or with 820 in FIG. 8.

At 1220, the UE may establish a sidelink connection with the first UE based on the adjusted transmission duration and the adjusted reception duration received from the first UE after transmitting the confirmation, e.g., as described in connection with FIG. 7. Alternately, at 1018, the UE may continue a sidelink connection with the first UE based on the adjusted transmission duration and the adjusted reception, e.g., as described in connection with FIG. 8. The sidelink RRC connection may be established or continued by the RRC component 1346 of the apparatus 1302 in FIG. 13.

As illustrated at 1214, the response may comprise a rejection of the DRX configuration. In such aspects, the UE may transmit, in the response, at least one of fifth timing information (e.g., [T6, T7]) for the DRX configuration for the sidelink transmission from the second UE and sixth timing information (e.g., [T4, T5]) for the DRX configuration for the sidelink reception by the second UE. FIG. 7 illustrates an example of a message 718 that indicates different timing information. FIG. 8 illustrates an example of a message 820 that indicates different timing information.

As illustrated at 1222, the UE may establish or continue a sidelink connection with the first UE with DRX based on at least one of the third timing information or the fourth timing information, e.g., if the first UE can use the timing information transmitted at 1216. The sidelink RRC connection may be established or continued by the RRC component 1346 of the apparatus 1302 in FIG. 13.

As illustrated at 1224, the UE may establish or continue a sidelink connection with the first UE without DRX based on the first UE not supporting the third timing information or the fourth timing information indicated by the UE. For example, FIG. 7 illustrates an example of the UE2 continuing the connection without DRX, at 722. FIG. 8 illustrates an example of the UE1 continuing the connection without DRX, at 824. The sidelink RRC connection may be established or continued by the RRC component 1346 of the apparatus 1302 in FIG. 13.

As illustrated at 1226, the UE may stop establishment of the sidelink connection with the first UE or release the sidelink connection with the first UE in response to the rejection of the DRX configuration based on the first UE not supporting the third timing information or the fourth timing information indicated by the second UE. For example, FIG. 7 illustrates an example of the UE2 stopping establishment of the connection without DRX, at 722. FIG. 8 illustrates an example of the UE1 releasing the connection without DRX, at 824. The establishment of the sidelink RRC connection may be stopped or the connection may be released by the RRC component 1346 of the apparatus 1302 in FIG. 13.

As illustrated at 1228, the UE may receive, from the first UE, different timing information for the sidelink transmission or the sidelink reception of the first UE in response to the rejection. As illustrated at 720 in FIGS. 7 and 820 in FIG. 8, the UE1 may transmit, and UE2 may receive, adjusted timing information [T4', T5'] and/or [T6', T7']. Or, the UE may receive different DRX time information to begin another iteration of the DRX negotiation with the first UE. The reception may be performed, e.g., by the sidelink DRX configuration component 1340 via the reception component 1330 and/or the RF transceiver 1322 of the apparatus 1302 in FIG. 13.

In other aspects, the response may comprise a rejection of the DRX configuration, at 1214 without the timing information, at 1216. The UE may establish or continue a sidelink connection, at 1224, with the first UE without DRX in response to the rejection of the DRX configuration. The sidelink RRC connection may be established or continued by the RRC component 1346 of the apparatus 1302 in FIG. 13.

In other aspects, the response may comprise a rejection of the DRX configuration, at 1214 without the timing information, at 1216, and the UE may stop establishment of a sidelink connection with the first UE or release the sidelink connection with the first UE, at 1226, in response to the rejection of the DRX configuration. The establishment of the sidelink RRC connection may be stopped or the connection may be released by the RRC component 1346 of the apparatus 1302 in FIG. 13.

Figure 13:
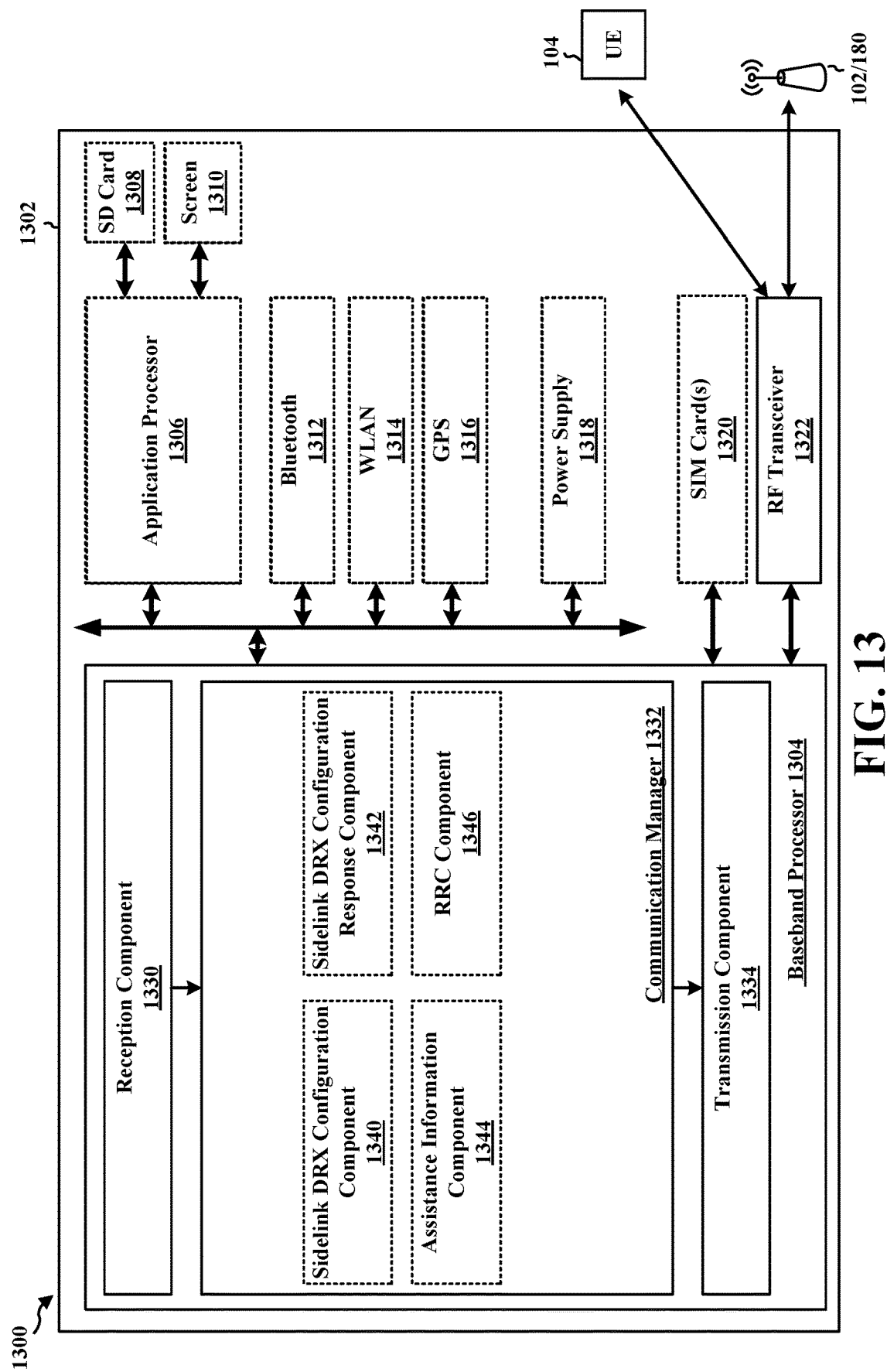
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, or another device configured to transmit and/or receive sidelink communication. The apparatus 1302 includes a baseband processor 1304 (also referred to as a modem) coupled to a RF transceiver 1322. In some aspects, the baseband processor 1304 may be a cellular baseband processor and/or the RF transceiver 1322 may be a cellular RF transceiver. The apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and/or a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described in the present application. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 may include components to perform any of the aspects of FIGS. 7-12. At times, the apparatus may be an initiating UE and at other times may be a responding UE. Thus, the apparatus may be configured to perform the aspects of an initiating UE, e.g., with a different responding UE and may be configured to perform the aspects of a responding UE in response to the initiation of an initiating UE. The communication manager 1332 includes sidelink DRX configuration component 1340 that is configured to perform any of the aspects of 904, 906, 1028, 1104, 1106, and/or 1228, e.g., as described in connection with any of FIGS. 9-12. The communication manager 1332 further includes a sidelink DRX configuration response component 1342 that is configured to perform any of the aspects of 908, 1010, 1012, 1014, 1016, 1108, 1210, 1212, 1214, and/or 1216, e.g., as described in connection with any of FIGS. 9-12. The communication manager 1332 may further include an assistance information component 1344 that is configured to perform any of the aspects of 1002 and/or 1202, e.g., as described in connection with FIG. 10 or FIG. 12. The communication manager 1332 may further include an RRC component 1346 configured to perform any of the aspects of 1018, 1020, 1022, 1024, 1026, 1218, 1220, 1222, 1224, and/or 1226, e.g., as described in connection with FIG. 10 or FIG. 12.

The apparatus may include additional components that perform each of the blocks of the algorithm in the flowcharts of FIGS. 7-12. As such, each block in the flowcharts of FIGS. 7-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband processor 1304, includes means for transmitting, to a second UE, a transmission configuration indicating first timing information for a DRX configuration for sidelink transmission from the first UE and for transmitting, to the second UE, a reception configuration indicating second timing information for the DRX configuration for sidelink reception by the first UE. The apparatus 1302 further includes means for receiving a response from the second UE confirming or rejecting the DRX configuration. The apparatus 1302 may further include means for receiving, prior to transmitting the transmission configuration or the reception configuration, a message from the second UE including at least one of third timing information for the DRX configuration for the sidelink reception from the second UE and fourth timing information for the DRX configuration for the sidelink transmission by the second UE. The apparatus 1302 may further include means for establishing or continuing a sidelink connection with the second UE based on the DRX configuration in response to receiving the confirmation. The apparatus 1302 may further include means for receiving, in the response, at least one of an adjusted transmission duration based on the first timing information or an adjusted reception duration based on the second timing information; and means for establishing or continuing a sidelink connection with the second UE with DRX based on the adjusted transmission duration and the adjusted reception duration received from the second UE. The apparatus 1302 may further include means for receiving, in the response, at least one of fifth timing information for the DRX configuration for the sidelink transmission from the second UE and sixth timing information for the DRX configuration for the sidelink reception by the second UE; and means for establishing or continuing a sidelink connection with the second UE with DRX based on at least one of the fifth timing information or the sixth timing information received from the second UE. The apparatus 1302 may further include means for receiving, in the response, at least one of fifth timing information for the DRX configuration for the sidelink transmission from the second UE and sixth timing information for the DRX configuration for the sidelink reception by the second UE. The apparatus 1302 may further include means for establishing or continuing a sidelink connection with the second UE without DRX based on the first UE not supporting the fifth timing information or the sixth timing information indicated by the second UE. The apparatus 1302 may further include means for stopping establishment of the sidelink connection with the second UE or releasing the sidelink connection with the second UE in response to the rejection of the DRX configuration based on the first UE not supporting the fifth timing information or the sixth timing information indicated by the second UE. The apparatus 1302 may further include means for transmitting, to the second UE, different timing information for the sidelink transmission or the sidelink reception of the first UE in response to the rejection. The apparatus 1302 may further include means for establishing or continuing a sidelink connection with the second UE without DRX in response to the rejection of the DRX configuration. The apparatus 1302 may further include means for stopping establishment of a sidelink connection with the second UE or releasing the sidelink connection with the second UE in response to the rejection of the DRX configuration.

The apparatus 1302 may further include means for receiving, from the first UE, a transmission configuration indicating first timing information for a DRX configuration for sidelink transmission from the first UE and for receiving, from the first UE, a reception configuration indicating second timing information for the DRX configuration for sidelink reception by the first UE. The apparatus 1302 may further include means for transmitting a response to the first UE confirming or rejecting the DRX configuration. The apparatus 1302 may further include means for transmitting, prior to receiving the transmission configuration or the reception configuration from the first UE, a message including at least one of third timing information for the DRX configuration for the sidelink reception from the second UE and fourth timing information for the DRX configuration for the sidelink transmission by the second UE. The apparatus 1302 may further include means for establishing or continuing a sidelink connection with the first UE based on the DRX configuration in response to receiving the confirmation. The apparatus 1302 may further include means for transmitting, in the response confirming the DRX configuration, at least one of an adjusted transmission duration based on the first timing information or an adjusted reception duration based on the second timing information. The apparatus 1302 may further include means for establishing or continuing a sidelink connection with the first UE with DRX based on the adjusted transmission duration and the adjusted reception duration. The apparatus 1302 may further include means for transmitting, in the response confirming the DRX configuration, at least one of fifth timing information for the DRX configuration for the sidelink transmission from the second UE and sixth timing information for the DRX configuration for the sidelink reception by the second UE. The apparatus 1302 may further include means for receiving a reconfiguration message from the first UE accepting the at least one of the fifth timing information or the sixth timing information. The apparatus 1302 may further include means for establishing or continuing a sidelink connection with the first UE with DRX based on at least one of the fifth timing information or the sixth timing information. The apparatus 1302 may further include means for transmitting, in the response, at least one of fifth timing information for the DRX configuration for the sidelink transmission from the second UE and sixth timing information for the DRX configuration for the sidelink reception by the second UE. The apparatus 1302 may further include means for receiving a message from the first UE rejecting the at least one of the fifth timing information or the sixth timing information. The apparatus 1302 may further include means for establishing or continuing a sidelink connection with the first UE without DRX, ceasing establishment of the sidelink connection with the first UE, or releasing the sidelink connection with the first UE in response to the message. The apparatus 1302 may further include means for establishing or continuing a sidelink connection with the first UE without DRX. The apparatus 1302 may further include means for stopping establishment of a sidelink connection with the second UE or releasing the sidelink connection with the second UE.

The means described above may be one or more of the components of the apparatus 1302 configured to perform the functions recited by the means. As described herein, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example aspects are illustrative only and may be combined with aspects of other examples or teachings described herein, without limitation.

Aspect 1 is a method of wireless communication at a first user equipment (UE), comprising: transmitting, to a second UE, a transmission configuration indicating first timing information for a discontinuous reception (DRX) configuration for sidelink transmission from the first UE; transmitting, to the second UE, a reception configuration indicating second timing information for the DRX configuration for sidelink reception by the first UE; and receiving a response from the second UE confirming or rejecting the DRX configuration.

In aspect 2, the method of aspect 1 further includes that the transmission configuration with the first timing information and the reception configuration with the second timing information are transmitted in a radio resource control (RRC) message for sidelink RRC reconfiguration.

In aspect 3, the method of aspect 1 or aspect 2 further includes receiving, prior to transmitting the transmission configuration or the reception configuration, a message from the second UE including at least one of third timing information for the DRX configuration for the sidelink reception from the second UE and fourth timing information for the DRX configuration for the sidelink transmission by the second UE.

In aspect 4, the method of aspect 3 further includes that the message from the second UE comprises a radio resource control (RRC) message including UE assistance information for sidelink.

In aspect 5, the method of any of aspects 1-4 further includes that the first timing information includes a first starting point and a first ending point for a DRX ON duration within a transmission DRX cycle and the second timing information includes a second starting point and a second ending point for the DRX on duration within a reception DRX cycle.

In aspect 6, the method of any of aspects 1-5 further includes that the transmission configuration further includes a transmission DRX cycle period for the sidelink transmission from the first UE and the reception configuration further includes a reception DRX cycle period for the sidelink reception by the first UE.

In aspect 7, the method of any of aspects 1-6 further includes that the transmission configuration further includes a first offset for starting the sidelink transmission from the first UE and the reception configuration further includes a second offset for starting the sidelink reception by the first UE.

In aspect 8, the method of any of aspects 1-7 further includes that the response comprises a confirmation of the DRX configuration, the method further comprising: establishing or continuing a sidelink connection with the second UE based on the DRX configuration in response to receiving the confirmation.

In aspect 9, the method of any of aspects 1-7 further includes that the response comprises a confirmation of the DRX configuration, the method further comprising: receiving, in the response, at least one of an adjusted transmission duration based on the first timing information or an adjusted reception duration based on the second timing information; and establishing or continuing a sidelink connection with the second UE with DRX based on the adjusted transmission duration and the adjusted reception duration received from the second UE.

In aspect 10, the method of any of aspects 1-7 further includes that the response comprises a rejection of the DRX configuration, the method further comprising: receiving, in the response, at least one of fifth timing information for the DRX configuration for the sidelink transmission from the second UE and sixth timing information for the DRX configuration for the sidelink reception by the second UE; and establishing or continuing a sidelink connection with the second UE with DRX based on at least one of the fifth timing information or the sixth timing information received from the second UE.

In aspect 11, the method of any of aspects 1-7 further includes that, wherein the response comprises a rejection of the DRX configuration, the method further comprising: receiving, in the response, at least one of fifth timing information for the DRX configuration for the sidelink transmission from the second UE and sixth timing information for the DRX configuration for the sidelink reception by the second UE; and in response to the rejection of the DRX configuration, performing one of: establishing or continuing a sidelink connection with the second UE without DRX based on the first UE not supporting the fifth timing information or the sixth timing information indicated by the second UE, stopping establishment of the sidelink connection with the second UE or releasing the sidelink connection with the second UE in response to the rejection of the DRX configuration based on the first UE not supporting the fifth timing information or the sixth timing information indicated by the second UE, or transmitting, to the second UE, different timing information for the sidelink transmission or the sidelink reception of the first UE in response to the rejection.

In aspect 12, the method of any of aspects 1-7 further includes that the response comprises a rejection of the DRX configuration, the method further comprising: establishing or continuing a sidelink connection with the second UE without DRX in response to the rejection of the DRX configuration.

In aspect 13, the method of any of aspects 1-7 further includes that the response comprises a rejection of the DRX configuration, the method further comprising: stopping establishment of a sidelink connection with the second UE or releasing the sidelink connection with the second UE in response to the rejection of the DRX configuration.

Aspect 14 is a method of wireless communication including receiving discontinuous reception (DRX) information from a first user equipment (UE) at a second UE, comprising: receiving, from the first UE, a transmission configuration indicating first timing information for a discontinuous reception (DRX) configuration for sidelink transmission from the first UE; receiving, from the first UE, a reception configuration indicating second timing information for the DRX configuration for sidelink reception by the first UE; and transmitting a response to the first UE confirming or rejecting the DRX configuration.

In aspect 15, the method of aspect 14 further includes that the transmission configuration with the first timing information and the reception configuration with the second timing information are received in a radio resource control (RRC) message for sidelink RRC reconfiguration.

In aspect 16, the method of aspect 14 or aspect 15 further includes transmitting, prior to receiving the transmission configuration or the reception configuration from the first UE, a message including at least one of third timing information for the DRX configuration for the sidelink reception from the second UE and fourth timing information for the DRX configuration for the sidelink transmission by the second UE.

In aspect 17, the method of aspect 16 further includes that the message from the second UE comprises a radio resource control (RRC) message including UE assistance information for sidelink.

In aspect 18, the method of any of aspects 14-17 further includes that the first timing information indicates a first starting point and a first ending point for a first DRX ON duration within a transmission DRX cycle and the second timing information indicates a second starting point and a second ending point for a second DRX ON duration within a reception DRX cycle respectively.

In aspect 19, the method of any of aspects 14-18 further includes that the transmission configuration further includes a first offset for starting the sidelink transmission from the first UE and the reception configuration further includes a second offset for starting the sidelink reception by the first UE.

In aspect 20, the method of any of aspects 14-19 further includes that the transmission configuration further includes a transmission DRX cycle period for the sidelink transmission from the first UE and the reception configuration further includes a reception DRX cycle period for the sidelink reception by the first UE.

In aspect 21, the method of any of aspects 14-19 further includes that the response comprises a confirmation of the DRX configuration, the method further comprising: establishing or continuing a sidelink connection with the first UE based on the DRX configuration in response to receiving the confirmation.

In aspect 22, the method of any of aspects 14-19 further includes that the response comprises a confirmation of the DRX configuration, the method further comprising: transmitting, in the response confirming the DRX configuration, at least one of an adjusted transmission duration based on the first timing information or an adjusted reception duration based on the second timing information; and establishing or continuing a sidelink connection with the first UE with DRX based on the adjusted transmission duration and the adjusted reception duration.

In aspect 23, the method of any of aspects 14-19 further includes that the response comprises a rejection of the DRX, the method further comprising: transmitting, in the response confirming the DRX configuration, at least one of fifth timing information for the DRX configuration for the sidelink transmission from the second UE and sixth timing information for the DRX configuration for the sidelink reception by the second UE; receiving a reconfiguration message from the first UE accepting the at least one of the fifth timing information or the sixth timing information; and establishing or continuing a sidelink connection with the first UE with DRX based on at least one of the fifth timing information or the sixth timing information.

In aspect 24, the method of any of aspects 14-19 further includes that the response comprises a rejection of the DRX configuration, the method further comprising: transmitting, in the response, at least one of fifth timing information for the DRX configuration for the sidelink transmission from the second UE and sixth timing information for the DRX configuration for the sidelink reception by the second UE; receiving a message from the first UE rejecting the at least one of the fifth timing information or the sixth timing information; and establishing or continuing a sidelink connection with the first UE without DRX, ceasing establishment of the sidelink connection with the first UE, or releasing the sidelink connection with the first UE in response to the message.

In aspect 25, the method of any of aspects 14-19 further includes that the response comprises a rejection of the DRX configuration, the method further comprising: establishing or continuing a sidelink connection with the first UE without DRX.

In aspect 26, the method of any of aspects 14-19 further includes that the response comprises a rejection of the DRX configuration, the method further comprising: stopping establishment of a sidelink connection with the second UE or releasing the sidelink connection with the second UE.

Aspect 27 is an apparatus for wireless communication at a first user equipment (UE), comprising: a memory; and at least one processor coupled to the memory and configured to: transmit, to a second UE, a transmission configuration indicating first timing information for a discontinuous reception (DRX) configuration for sidelink transmission from the first UE; transmit, to the second UE, a reception configuration indicating second timing information for the DRX configuration for sidelink reception by the first UE; and receive a response from the second UE confirming or rejecting the DRX configuration.

In aspect 28, the memory and the at least one processor of aspect 27 are further configured to perform the method of any of claims 2-13.

In aspect 29, the apparatus of aspect 27 or 28 further includes at least one transceiver coupled to the at least one processor.

In aspect 30, the apparatus of any of aspects 27-29 further includes at least one antenna coupled to the at least one processor.

Aspect 31 is an apparatus for wireless communication at a first user equipment (UE), comprising: means for transmitting, to a second UE, a transmission configuration indicating first timing information for a discontinuous reception (DRX) configuration for sidelink transmission from the first UE; means for transmitting, to the second UE, a reception configuration indicating second timing information for the DRX configuration for sidelink reception by the first UE; and means for receiving a response from the second UE confirming or rejecting the DRX configuration.

In aspect 32, the apparatus of aspect 31, further comprises means to perform the method of any of claims 2-13.

In aspect 33, the apparatus of aspect 31 or 32 further includes at least one transceiver.

In aspect 34, the apparatus of any of aspects 31-33 further includes at least one antenna.

Aspect 35 is a non-transitory computer-readable storage medium storing computer executable code for wireless communication at a first user equipment (UE), the code when executed by a processor cause the processor to: transmit, to a second UE, a transmission configuration indicating first timing information for a discontinuous reception (DRX) configuration for sidelink transmission from the first UE; transmit, to the second UE, a reception configuration indicating second timing information for the DRX configuration for sidelink reception by the first UE; and receive a response from the second UE confirming or rejecting the DRX configuration.

In aspect 36, the computer-readable medium of aspect 35, further comprises code to perform the method of any of claims 2-13.

Aspect 37 is an apparatus for wireless communication including receiving discontinuous reception (DRX) information from a first user equipment (UE) at a second UE, comprising: a memory; and at least one processor coupled to the memory and configured to: receive, from the first UE, a transmission configuration indicating first timing information for a discontinuous reception (DRX) configuration for sidelink transmission from the first UE; receive, from the first UE, a reception configuration indicating second timing information for the DRX configuration for sidelink reception by the first UE; and transmit a response to the first UE confirming or rejecting the DRX configuration.

In aspect 38, the memory and the at least one processor of the apparatus in aspect 37 are further configured to perform the method of any of claims 15-26.

In aspect 39, the apparatus of aspect 37 or 38 further includes at least one transceiver coupled to the at least one processor.

In aspect 40, the apparatus of any of aspects 37-39 further includes at least one antenna coupled to the at least one processor.

Aspect 41 is an apparatus for wireless communication including receiving discontinuous reception (DRX) information from a first user equipment (UE) at a second UE, comprising: means for receiving, from the first UE, a transmission configuration indicating first timing information for a discontinuous reception (DRX) configuration for sidelink transmission from the first UE; means for receiving, from the first UE, a reception configuration indicating second timing information for the DRX configuration for sidelink reception by the first UE; and means for transmitting a response to the first UE confirming or rejecting the DRX configuration.

In aspect 42, the apparatus of aspect 41, further comprises means to perform the method of any of claims 15-26.

In aspect 43, the apparatus of aspect 41 or 42 further includes at least one transceiver.

In aspect 44, the apparatus of any of aspects 41-43 further includes at least one antenna.

Aspect 45 is a non-transitory computer-readable storage medium storing computer executable code for wireless communication including receiving discontinuous reception (DRX) information from a first UE at a second UE, the code when executed by a processor cause the processor to: receive, from the first UE, a transmission configuration indicating first timing information for a discontinuous reception (DRX) configuration for sidelink transmission from the first UE; receive, from the first UE, a reception configuration indicating second timing information for the DRX configuration for sidelink reception by the first UE; and transmit a response to the first UE confirming or rejecting the DRX configuration.

In aspect 46, the computer-readable medium of aspect 45, further comprises code to perform the method of any of claims 15-26.

What is claimed is:

1. An apparatus for wireless communication at a first user equipment (UE), comprising:
    memory; and
    at least one processor coupled to the memory and configured to:
        receive a message from a second UE including third timing information for a discontinuous reception (DRX) configuration for sidelink reception by the second UE;
        transmit, to the second UE, a transmission configuration indicating first timing information for the DRX configuration for sidelink transmission from the first UE;
        transmit, to the second UE, a reception configuration indicating second timing information for the DRX configuration for sidelink reception by the first UE; and
        receive a response from the second UE that confirms or rejects the DRX configuration.

2. The apparatus of claim 1, wherein the transmission configuration with the first timing information and the reception configuration with the second timing information are comprised in a radio resource control (RRC) message for sidelink RRC reconfiguration.

3. The apparatus of claim 1, wherein the message from the second UE comprises a radio resource control (RRC) message including UE assistance information for sidelink.

4. The apparatus of claim 1, wherein the first timing information includes a first starting point and a first ending point for a DRX ON duration within a transmission DRX cycle and the second timing information includes a second starting point and a second ending point for the DRX on duration within a reception DRX cycle.

5. The apparatus of claim 1, wherein the transmission configuration further includes a transmission DRX cycle period for the sidelink transmission from the first UE and the reception configuration further includes a reception DRX cycle period for the sidelink reception by the first UE.

6. The apparatus of claim 1, wherein the transmission configuration further includes a first offset for starting the sidelink transmission from the first UE and the reception configuration further includes a second offset for starting the sidelink reception by the first UE.

7. The apparatus of claim 1, wherein the response comprises a confirmation of the DRX configuration, the at least one processor being further configured to:
 establish or continue a sidelink connection with the second UE based on the DRX configuration in response to a reception of the confirmation.

8. The apparatus of claim 1, wherein the response comprises a rejection of the DRX configuration, the at least one processor being further configured to:
 establish or continue a sidelink connection with the second UE without DRX in response to the rejection of the DRX configuration.

9. The apparatus of claim 1, wherein the response comprises a rejection of the DRX configuration, the at least one processor being further configured to:
 stop establishment of a sidelink connection with the second UE or release the sidelink connection with the second UE in response to the rejection of the DRX configuration.

10. The apparatus of claim 1, further comprising:
 at least one antenna coupled to the at least one processor.

11. An apparatus for wireless communication at a first user equipment (UE), comprising:
 memory; and
 at least one processor coupled to the memory and configured to:
  transmit, to a second UE, a transmission configuration indicating first timing information for a discontinuous reception (DRX) configuration for sidelink transmission from the first UE;
  transmit, to the second UE, a reception configuration indicating second timing information for the DRX configuration for sidelink reception by the first UE;
  receive a response from the second UE that confirms or rejects the DRX configuration, wherein the response comprises a confirmation of the DRX configuration and at least one of an adjusted transmission duration based on the first timing information or an adjusted reception duration based on the second timing information; and
  establish or continue a sidelink connection with the second UE with DRX based on the adjusted transmission duration and the adjusted reception duration received from the second UE.

12. An apparatus for wireless communication at a first user equipment (UE), comprising:
 memory; and
 at least one processor coupled to the memory and configured to:
  transmit, to a second UE, a transmission configuration indicating first timing information for a discontinuous reception (DRX) configuration for sidelink transmission from the first UE;
  transmit, to the second UE, a reception configuration indicating second timing information for the DRX configuration for sidelink reception by the first UE;
  receive a response from the second UE that confirms or rejects the DRX configuration, wherein the response comprises a rejection of the DRX configuration and at least one of third timing information for the DRX configuration for the sidelink transmission from the second UE or fourth timing information for the DRX configuration for the sidelink reception by the second UE; and
  establish or continue a sidelink connection with the second UE with DRX based on at least one of the third timing information or the fourth timing information received from the second UE.

13. An apparatus for wireless communication at a first user equipment (UE), comprising:
 memory; and
 at least one processor coupled to the memory and configured to:
  transmit, to a second UE, a transmission configuration indicating first timing information for a discontinuous reception (DRX) configuration for sidelink transmission from the first UE;
  transmit, to the second UE, a reception configuration indicating second timing information for the DRX configuration for sidelink reception by the first UE;
  receive a response from the second UE that confirms or rejects the DRX configuration, wherein the response comprises a rejection of the DRX configuration and at least one of third timing information for the DRX configuration for the sidelink transmission from the second UE or fourth timing information for the DRX configuration for the sidelink reception by the second UE; and
  in response to the rejection of the DRX configuration, perform one of:
   establish or continue a sidelink connection with the second UE without DRX based on the first UE not supporting the third timing information or the fourth timing information indicated by the second UE,
   stop establishment of the sidelink connection with the second UE or release the sidelink connection with the second UE in response to the rejection of the DRX configuration based on the first UE not supporting the third timing information or the fourth timing information indicated by the second UE, or
   transmit, to the second UE, different timing information for the sidelink transmission or the sidelink reception of the first UE in response to the rejection.

14. An apparatus for wireless communication at a second user equipment (UE) including discontinuous reception (DRX) information from a first UE, the apparatus comprising:
 memory; and
 at least one processor coupled to the memory and configured to:
  transmit a message including at least one of third timing information for a DRX configuration for sidelink reception by the second UE;
  receive, from the first UE, a transmission configuration indicating first timing information for the DRX configuration for sidelink transmission from the first UE;
  receive, from the first UE, a reception configuration indicating second timing information for the DRX configuration for sidelink reception by the first UE; and
  transmit a response to the first UE confirming or rejecting the DRX configuration.

15. The apparatus of claim 14, wherein the transmission configuration with the first timing information and the reception configuration with the second timing information are comprised in a radio resource control (RRC) message for sidelink RRC reconfiguration.

16. The apparatus of claim 14, wherein the message from the second UE comprises a radio resource control (RRC) message including UE assistance information for sidelink.

17. The apparatus of claim 14, wherein the first timing information indicates a first starting point and a first ending point for a first DRX ON duration within a transmission DRX cycle and the second timing information indicates a second starting point and a second ending point for a second DRX ON duration within a reception DRX cycle respectively.

18. The apparatus of claim 14, wherein the transmission configuration further includes a first offset for starting the sidelink transmission from the first UE and the reception configuration further includes a second offset for starting the sidelink reception by the first UE.

19. The apparatus of claim 14, wherein the transmission configuration further includes a transmission DRX cycle period for the sidelink transmission from the first UE and the reception configuration further includes a reception DRX cycle period for the sidelink reception by the first UE.

20. The apparatus of claim 14, wherein the response comprises a confirmation of the DRX configuration, the at least one processor being further configured to:
establish or continue a sidelink connection with the first UE based on the DRX configuration in response to a reception of the confirmation.

21. The apparatus of claim 14, wherein the response comprises a rejection of the DRX configuration, the at least one processor being further configured to:
establish or continue a sidelink connection with the first UE without DRX.

22. The apparatus of claim 14, wherein the response comprises a rejection of the DRX configuration, the at least one processor being further configured to:
stop establishment of a sidelink connection with the second UE or release the sidelink connection with the second UE.

23. The apparatus of claim 14, further comprising:
at least one antenna coupled to the at least one processor.

24. An apparatus for wireless communication at a second user equipment (UE) including discontinuous reception (DRX) information from a first UE, the apparatus comprising:
memory; and
at least one processor coupled to the memory and configured to:
receive, from the first UE, a transmission configuration indicating first timing information for a DRX configuration for sidelink transmission from the first UE;
receive, from the first UE, a reception configuration indicating second timing information for the DRX configuration for sidelink reception by the first UE;
transmit a response to the first UE confirming or rejecting the DRX configuration, wherein the response comprises a confirmation of the DRX configuration and at least one of an adjusted transmission duration based on the first timing information or an adjusted reception duration based on the second timing information; and
establish or continue a sidelink connection with the first UE with DRX based on the adjusted transmission duration and the adjusted reception duration.

25. An apparatus for wireless communication at a second user equipment (UE) including discontinuous reception (DRX) information from a first UE, the apparatus comprising:
memory; and
at least one processor coupled to the memory and configured to:
receive, from the first UE, a transmission configuration indicating first timing information for a DRX configuration for sidelink transmission from the first UE;
receive, from the first UE, a reception configuration indicating second timing information for the DRX configuration for sidelink reception by the first UE;
transmit a response to the first UE confirming or rejecting the DRX configuration, wherein the response comprises a rejection of the DRX configuration and at least one of third timing information for the DRX configuration for the sidelink transmission from the second UE or fourth timing information for the DRX configuration for the sidelink reception by the second UE;
receive a reconfiguration message from the first UE accepting the at least one of the third timing information or the fourth timing information; and
establish or continue a sidelink connection with the first UE with DRX based on at least one of the third timing information or the fourth timing information.

26. An apparatus for wireless communication at a second user equipment (UE) including discontinuous reception (DRX) information from a first UE, the apparatus comprising:
memory; and
at least one processor coupled to the memory and configured to:
receive, from the first UE, a transmission configuration indicating first timing information for a DRX configuration for sidelink transmission from the first UE;
receive, from the first UE, a reception configuration indicating second timing information for the DRX configuration for sidelink reception by the first UE;
transmit a response to the first UE confirming or rejecting the DRX configuration, wherein the response comprises a rejection of the DRX configuration and at least one of third timing information for the DRX configuration for the sidelink transmission from the second UE or fourth timing information for the DRX configuration for the sidelink reception by the second UE;
receive a message from the first UE rejecting the at least one of the third timing information or the fourth timing information; and
establish or continue a sidelink connection with the first UE without DRX, ceasing establishment of the sidelink connection with the first UE, or release the sidelink connection with the first UE in response to the message.

27. A method of wireless communication at a first user equipment (UE), comprising:
receiving a message from a second UE including at least one of third timing information for a discontinuous reception (DRX) configuration for sidelink reception by the second UE;

transmitting, to the second UE, a transmission configuration indicating first timing information for the DRX configuration for sidelink transmission from the first UE;
transmitting, to the second UE, a reception configuration indicating second timing information for the DRX configuration for sidelink reception by the first UE; and
receiving a response from the second UE confirming or rejecting the DRX configuration.

28. A method of wireless communication including receiving discontinuous reception (DRX) information from a first user equipment (UE) at a second UE, comprising:
transmitting a message including at least one of third timing information for a DRX configuration for sidelink reception by the second UE;
receiving, from the first UE, a transmission configuration indicating first timing information for the DRX configuration for sidelink transmission from the first UE;
receiving, from the first UE, a reception configuration indicating second timing information for the DRX configuration for sidelink reception by the first UE; and
transmitting a response to the first UE confirming or rejecting the DRX configuration.

29. An apparatus for wireless communication at a first user equipment (UE), comprising:
memory; and
at least one processor coupled to the memory and configured to:
transmit, to a second UE, a first sidelink (SL) discontinuous reception (DRX) configuration, the first SL DRX configuration comprising a first DRX cycle period;
receive a response from the second UE, the response confirming or rejecting the first DRX configuration; and
establish or continue a sidelink connection with the second UE without DRX in response to the rejection of the DRX configuration.

30. The apparatus of claim 29, the apparatus coupled to the memory being further configured to:
receive a message from the second UE prior to transmitting the first SL DRX configuration, the message comprising assistance information on sidelink DRX, the assistance information comprising a second DRX configuration.

31. The apparatus of claim 30, the apparatus coupled to the memory being further configured to:
determine the first SL DRX configuration based on the second SL DRX configuration.

32. The apparatus of claim 29, the first SL DRX configuration and the response being via RRC between the first UE and the second UE.

* * * * *